(12) United States Patent
Park et al.

(10) Patent No.: US 10,616,607 B2
(45) Date of Patent: Apr. 7, 2020

(54) METHOD FOR ENCODING VIDEO OF MULTI-LAYER STRUCTURE SUPPORTING SCALABILITY AND METHOD FOR DECODING SAME AND APPARATUS THEREFOR

(71) Applicant: LG ELECTRONICS INC., Seoul (KR)

(72) Inventors: Joonyoung Park, Seoul (KR); Chulkeun Kim, Seoul (KR); Hendry Hendry, Seoul (KR); Byeongmoon Jeon, Seoul (KR); Jungsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 343 days.

(21) Appl. No.: 14/770,241

(22) PCT Filed: Feb. 25, 2014

(86) PCT No.: PCT/KR2014/001517
§ 371 (c)(1),
(2) Date: Aug. 25, 2015

(87) PCT Pub. No.: WO2014/129873
PCT Pub. Date: Aug. 28, 2014

(65) Prior Publication Data
US 2016/0014432 A1 Jan. 14, 2016

Related U.S. Application Data

(60) Provisional application No. 61/769,187, filed on Feb. 25, 2013.

(51) Int. Cl.
*H04N 19/82* (2014.01)
*H04N 19/30* (2014.01)

(52) U.S. Cl.
CPC ............. *H04N 19/82* (2014.11); *H04N 19/30* (2014.11)

(58) Field of Classification Search
CPC .............................. H04N 19/82; H04N 19/30
(Continued)

(56) References Cited

U.S. PATENT DOCUMENTS

| 2008/0165850 A1 | 7/2008 | Sagetong et al. |
| 2012/0219060 A1 | 8/2012 | Cehn et al. |
| 2012/0269270 A1* | 10/2012 | Chen .................... H04N 19/597 375/240.16 |

(Continued)

FOREIGN PATENT DOCUMENTS

| KR | 10-2008-0013881 A | 2/2008 |
| KR | 10-2008-0037593 A | 4/2008 |
| KR | 10-2013-0000334 A | 1/2013 |

OTHER PUBLICATIONS

Schwarz et al. "Description of scalable video coding technology proposal by Fraunhofer HHI (Configuration B)", No. JCTVC-K0043, Oct. 2 (Oct. 2, 2012), XP030112975.*

(Continued)

*Primary Examiner* — Sath V Perungavoor
*Assistant Examiner* — Kristin Dobbs
(74) *Attorney, Agent, or Firm* — Dentons US LLP

(57) ABSTRACT

The present invention relates to a method for encoding and decoding a video in a multi-layer structure supporting scalability and an apparatus therefor, and a method for decoding a video according to the present invention includes the steps of: deriving a prediction sample for the present block; restoring the present picture based on the prediction sample; applying the de-blocking filtering for the block edges in the restored present picture; and applying an offset for a sample of the restored picture.

11 Claims, 10 Drawing Sheets

(58) Field of Classification Search
USPC .................................. 375/240.26, 240.16
See application file for complete search history.

(56) References Cited

U.S. PATENT DOCUMENTS

2013/0294513 A1* 11/2013 Seregin .............. H04N 19/52
375/240.14

OTHER PUBLICATIONS

Kim et al. "Description of scalable video coding technology proposal by LG Electronics and MediaTek (differential coding mode on)", No. JCTVC-K0033, Oct. 1, 2012 (Oct. 1, 2012), XP030112965.*

Schwarz, et al.: "Description of scalable video coding technology proposal by Fraunhofer HHI (Configuration B)", XP030112975, JCTVC-K0043, Joint Collaborative Team on Video Coding (JCT-VC) of ITU-T SG-16 WP3 and ISO/IEC JTC1/SC29/WG11, 11th Meeting, Shanghai, CN, Oct. 10-19, 2012.

Kim, et al.: "Description of scalable video coding technology proposal by LG Electronics and MediaTek (differential coding mode on)", XP030112965, JCTVC-K0033, Joint Collaborative Team on Video Coding (JCT-VC) of ITU-T SG-16 WP3 and ISO/IEC JTC1/SC29/WG11, 11th Meeting, Shanghai, CN, Oct. 10-19, 2012.

Tan, et al.: "Non-TE5: On the effectiveness of temporal and base layer co-located motion vector prediction candidates", XP030113561, JCTVC-K0073, Joint Collaborative Team on Video Coding (JCT-VC) of ITU-T SG-16 WP3 and ISO/IEC JTC1/SC29/WG11, 12th Meeting, Geneva, CH, Jan. 14-23, 2011.

* cited by examiner

METHOD FOR ENCODING VIDEO OF MULTI-LAYER STRUCTURE SUPPORTING SCALABILITY AND METHOD FOR DECODING SAME AND APPARATUS THEREFOR

This application is a U.S. National Phase Application under 35 U.S.C. § 371 of International Application PCT/KR2014/001517, filed on Feb. 25, 2014, which claims the benefit of U.S. Provisional Application No. 61/769,184 filed on Feb. 25, 2013, the entire content of the prior applications is hereby incorporated by reference.

BACKGROUND OF THE INVENTION

Field of the Invention

The present invention relates to video encoding and decoding, and more particularly, to a method and an apparatus for reconstructing a picture to be encoded/decoded in a current layer in a multilayer structure.

Related Art

Recently, demands for high-resolution and high-quality images have increased in various fields of applications. As images have higher resolution and higher quality, the amount of information on the pictures also increases.

With a growing amount of information, multi-functional devices and networks with various environments are introduced. Accordingly, the same content may be utilized with different levels of quality.

Specifically, as terminals are able to support diverse qualities of pictures and various network environments are established, an image with general quality is enabled in one environment while a higher-quality image may be available in another environment.

For example, a user may enjoy video content purchased through a portable terminal on a large-screen display with higher resolution at home.

In recent years, as high definition (HD) broadcast services are available, a large number of users are getting used to high-resolution and high-quality videos and service providers and service users also pay attention to ultrahigh-definition (UHD) services having a resolution four times higher than HDTV.

Thus, there is a need to provide scalability to video quality, for example, the image quality, resolution, size and frame rate of a video, based on high-efficiency encoding and decoding methods on a high-capacity video so as to offer varied qualities of video services in different environments for users' demands. Further, discussions on various video processing methods involved in scalability are also necessary.

SUMMARY OF THE INVENTION

The present invention aims to provide a method and apparatus for performing effective inter-layer prediction in scalable video coding with a multi-layer structure.

The present invention aims to provide a method and apparatus for effectively reconstructing a picture of a current layer by using a picture of another layer for inter-layer prediction in scalable video coding with a multi-layer structure.

The present invention aims to provide a method and apparatus for using motion information including a motion vector for a picture of another layer for inter-layer prediction in scalable video coding with a multi-layer structure.

One embodiment of the present invention provides a video decoding method in a multi-layer structure supporting scalability. The method includes: deriving a prediction sample for a current block on the basis of possibility of performing inter-layer prediction for the current block, reconstructing a current picture by adding the prediction sample and a residual signal; applying a deblocking filter to a block edge in the reconstructed current picture; and applying a band offset or an edge offset to a sample of the current picture.

Another embodiment of the present invention provides a video encoding method in a multi-layer structure supporting scalability. The method includes: deriving a prediction sample for a current block on the basis of possibility of performing inter-layer prediction for the current block, generating a residual which is a difference between the prediction sample and an original signal; and transmitting information regarding the residual and information for deriving the prediction sample.

According to the present invention, video coding efficiency can be increased by performing effective inter-layer prediction in scalable video coding in a multi-layer structure.

According to the present invention, a picture of a current layer can be effectively reconstructed by referring to a picture of a different layer for inter-layer prediction in scalable video coding in a multi-layer structure.

According to the present invention, motion information including a motion vector for a picture of a different layer can be effectively used for inter-layer prediction in scalable video coding in a multi-layer structure.

DESCRIPTION OF EXEMPLARY EMBODIMENTS

Figure 1:
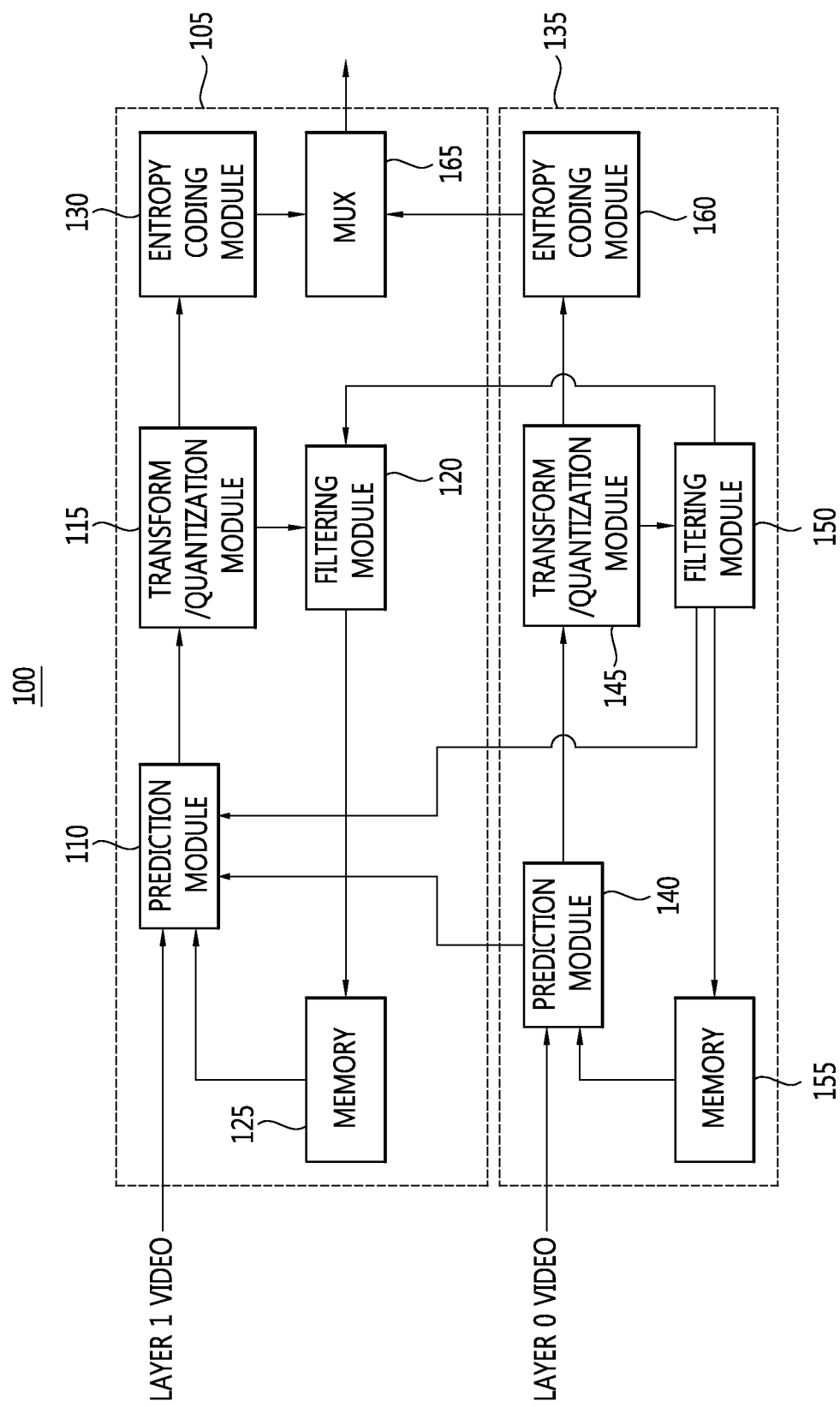
FIG. 1 is a block diagram schematically illustrating a video encoder that supports scalability according to an embodiment of the present invention.

The present invention can be modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding apparatus and does not mean that the elements are embodied by independent hardware or independent software. For example, two or more elements of the elements may be combined to form a single element, or one element may be divided into plural elements. The embodiments in which the elements are combined and/or divided belong to the scope of the invention without departing from the concept of the invention.

Hereinafter, exemplary embodiments of the invention will be described in detail with reference to the accompanying drawings. Like constituents in the drawings will be referenced by like reference numerals and will not be repeatedly described.

In a video coding method that supports scalability (hereinafter, referred to as "scalable coding"), input signals can be processed by layers. Depending on the layers, the input signals (input images) may be different from each other in at least one of a resolution, a frame rate, a bit depth, a color format, and an aspect ratio.

In this description, scalable coding includes scalable encoding and scalable decoding.

In scalable encoding/decoding, it is possible to reduce duplicate transmission/processing of information and to enhance compression efficiency by performing inter-layer prediction using an inter-layer difference, that is, on the basis of scalability.

FIG. 1 is a block diagram schematically illustrating a video encoder that supports scalability according to an embodiment of the invention.

FIG. 1 illustrates a multilayer structure including two layers for convenience of description. However, the present invention is not limited thereto and a multilayer structure according to the present invention may include two or more layers.

Referring to FIG. 1, the video encoder 100 includes an encoding module 105 for layer 1 and an encoding module 135 for layer 0.

Layer 0 may be a base layer, a reference layer or a lower layer, and layer 1 may be an enhancement layer, a current layer or an upper layer.

The encoding module 105 for layer 1 includes a prediction module 110, a transform/quantization module 115, a filtering module 120, a decoded picture buffer (DPB) 125, an entropy coding module 130, and a multiplexer (MUX) 165.

The encoding module 135 for layer 0 includes a prediction module 140, a transform/quantization module 145, a filtering module 150, a DPB 155, and an entropy coding module 160.

The prediction modules 110 and 140 may perform inter prediction and intra prediction on an input image. The prediction modules 110 and 140 may perform the predictions by predetermined processing units. The processing unit for prediction may be a coding unit (CU), a prediction unit (PU), or may be a transform unit (TU).

For example, the prediction modules 110 and 140 may determine whether to conduct inter prediction or intra prediction by CU, may determine a prediction mode by PU, and may perform prediction by PU or TU. Prediction to be performed includes construction of a predicted block and construction of a residual block (residual signal).

In the inter prediction, the prediction may be performed on the basis of information on at least one of a previous picture and/or a subsequent picture of a current picture to construct a predicted block. In the intra prediction, the prediction may be performed on the basis of information on a pixel in a current picture to construct a predicted block.

Examples of an inter prediction mode or method include a skip mode, a merge mode, a motion vector prediction (MVP) mode. In the inter prediction, a reference picture for a current PU to be predicted may be selected and a reference block corresponding to the current PU may be selected from the reference picture. The prediction modules 110 and 140 may construct a predicted block on the basis of the reference block.

The predicted block may be constructed as an integer sample unit or as a fractional pixel unit. Here, a motion vector may also be represented in a fractional pixel.

Motion information in the inter prediction, that is, information such as an index, a motion vector and a residual signal of a reference picture, is entropy-encoded and is transmitted to a video decoder. When a skip mode is applied, the residual signal may not be created, transformed, quantized, and transmitted at all.

Prediction modes in the intra prediction may include 33 directional prediction modes and at least two non-directional modes. The non-directional modes may include a DC prediction mode and a planar mode. In the intra prediction, a predicted block may be constructed after a filter is applied to a reference sample.

A PU may be a block with various sizes and shapes. For example, in inter prediction, a PU may be a 2N×2N, 2N×N, N×2N or N×N block (where N is an integer). In intra prediction, a PU may be a 2N×2N or N×N block (where N is an integer). A PU with a size of N×N may be set to be applied only to a specific case. For example, the PU with the size of N×N may be set to be used only for a smallest CU or only for intra prediction. In addition to the PUs with the above-mentioned sizes, a PU may be further defined as an N×mN block, an mN×N block, a 2N×mN block, or an mN×2N block (where m<1) for use.

Further, The prediction modules 110 may perform prediction for layer 1 using information on layer 0. In this specification, a process of predicting current layer information using another layer information is defined as an inter-layer prediction for convenience.

The current layer information predicted using the other layer information (that is, predicted by the inter-layer prediction) may include at least one selected from a texture, motion information, unit information, a predetermined parameter (for example, a filtering parameter).

The other layer information used for predicting the current layer information (that is, used for the inter-layer prediction) may include at least one selected form a texture, motion information, unit information, a predetermined parameter (for example, a filtering parameter).

In inter-layer prediction, a current block is a block in a current picture in a current layer (layer 1 in FIG. 1), which may be a block to be encoded. A reference block is a block in a picture (reference picture) belonging to the same access unit (AU) as the picture (current picture) including the current block, which may be a block corresponding to the current block in a layer (reference layer, layer 0 in FIG. 1) which is referred to in prediction of the current block.

An example of inter-layer prediction includes inter-layer motion prediction which predicts motion information on a current layer using motion information on a reference layer. According to inter-layer motion prediction, motion information on a current block may be predicted using motion information on a reference block.

When inter-layer motion prediction is applied, the prediction module 110 may scale and use motion information on a reference layer.

As another example of inter-layer prediction, inter-layer texture prediction may use a texture of a reconstructed reference block as the predictive value of a current block. Here, the prediction module 110 may scale the texture of the reference block by upsampling.

As still another example of inter-layer prediction, inter-layer unit information prediction may derive unit (CU, PU and/or TU) information on a reference layer to use as unit information on a current layer, or determine unit information on the current layer based on unit information on the reference layer.

Unit information may include information in each unit level. For instance, CU information may include information on partition (CU, PU and/or TU), information on transformation, information on prediction, and information on coding. PU information may include information on PU partition and information on prediction (for example, motion information and information on a prediction mode). TU information may include information on TU partition and information on transformation (transform coefficients and transform methods).

As yet another example of inter-layer prediction, inter-layer parameter prediction may reuse a derived parameter of a reference layer for a current layer or predict a parameter for the current layer based on the parameter used for the reference layer.

As still another example of inter-layer prediction, inter-layer residual prediction may predict a residual of a current layer using residual information on another layer and predict a current block based on the residual of the current layer.

As yet another example of inter-layer prediction, inter-layer differential prediction may predict a current block using a differential between pictures obtained by upsampling or downsampling a reconstructed picture in a current layer and a reconstructed picture in a reference layer.

As still another example of inter-layer prediction, inter-layer syntax prediction may predict or generate a texture of a current block using syntax information on a reference layer. Here, the syntax information on the reference layer used for reference may include information on an intra prediction mode, motion information and the like.

A plurality of inter-layer prediction methods among the afore-described methods may be used in prediction of a particular block.

Although inter-layer texture prediction, inter-layer motion prediction, inter-layer unit information prediction, inter-layer parameter prediction, inter-layer residual prediction, inter-layer differential prediction, and inter-layer syntax prediction have been described as examples of inter-layer prediction, inter-layer prediction applicable to the present invention is not limited thereto.

For instance, inter-layer prediction may be applied as an extension of inter prediction for a current layer. That is, a reference picture derived from a reference layer may be included in reference pictures available for reference in inter prediction of a current block to conduct inter prediction of the current block.

In this case, an inter-layer reference picture may be included in a reference picture list for the current block. The prediction module 110 may perform inter prediction of the current block using the inter-layer reference picture.

Here, the inter-layer reference picture may be a reference picture constructed by sampling a reconstructed picture in the reference layer to correspond to the current layer. Thus, when the reconstructed picture in the reference layer corresponds to a picture in the current layer, the reconstructed picture in the reference layer may be used as an inter-layer reference picture without sampling. For instance, when samples of the reconstructed picture in the reference layer and the reconstructed picture in the current layer have the same width and height and offsets between the picture in the reference layer and the picture in the current layer at the top left, top right, bottom left and bottom right are 0, the reconstructed picture in the reference layer may be used as an inter-layer reference picture for the current layer without being subjected to sampling.

The reconstructed picture in the reference layer from which the inter-layer reference picture is derived may belong to the same AU as the current picture to be encoded.

When inter prediction of the current block is performed with the reference picture list including the inter-layer reference picture, the position of the inter-layer reference picture in the reference picture list may vary in reference picture lists L0 and L1. For instance, in reference picture list L0, the inter-layer reference picture may be positioned subsequent to short-term reference pictures prior to the current picture. In reference picture list L1, the inter-layer reference picture may be positioned last.

Here, reference picture list L0 is a reference picture list used for inter prediction of a predictive slice ("P slice") or used as a first reference picture list in inter prediction of a bi-predictive slice ("B slice"). Reference picture list L1 is a second reference picture list used in inter prediction of the B slice.

Thus, reference picture list L0 may be constructed by sequentially including short-term reference picture(s) prior to the current picture, the inter-layer reference picture, short-term reference picture(s) subsequent to the current picture, and a long-term reference picture. Reference picture list L1 may be constructed by sequentially including short-term reference picture(s) subsequent to the current picture, short-term reference picture(s) prior to the current picture, a long-term reference picture, and the inter-layer reference picture.

Here, a P slice is a slice to be subjected to intra prediction or to inter prediction using at most one motion vector per prediction block and a reference picture index. A B slice is a slice to be subjected to intra prediction or to prediction using at most two motion vectors per prediction block and a reference picture index. Further, an intra slice ("I slice") is a slice subjected only to intra prediction.

A slice is a sequence of one or more slice segments. A slice sequence starts from an independent slice segment. When dependent slice segments preceding a next independent slice segment are present in the same AU, a slice includes an independent slice segment as the starter of a slice sequence and the dependent slice segments prior to the next independent slice.

Slice segments may be a sequence of coding tree units (CTUs) or coding tree blocks (CTBs) consecutively ordered in a tile scan and included in a single network abstraction layer (NAL) unit. A CTU is a coding unit in a quadtree structure, which may be a largest coding unit (LCU). In this specification, the terms "CTU" and "LCU" may collectively be used as necessary for better understanding of the invention.

In a slice segment, a first CTB (CTU) of a slice segment or a portion including a data element about all CTBs (CTUs) is referred to as a slice segment head. Here, a slice segment head of an independent slice segment is referred to as a slice header.

A slice may be a transfer unit of an NAL unit. For example, an NAL unit may be constructed by including slices or slice segments.

When inter prediction of the current block is performed based on the reference picture list including the inter-layer reference picture, the reference picture list may include a plurality of inter-layer reference pictures derived from a plurality of layers.

When the reference picture list includes a plurality of inter-layer reference pictures, the inter-layer reference pictures may be arranged in an interchanged manner in L0 and L1. For example, suppose that two inter-layer reference pictures, inter-layer reference picture ILRPi and inter-layer reference picture ILRPj, are included in the reference picture list used for inter prediction of the current block. In this case, ILRPi may be positioned subsequent to short-term reference pictures prior to the current picture and ILRPj may be positioned last in reference picture list L0. Also, ILRPi may be positioned last and ILRPj may be positioned subsequent to short-term reference pictures prior to the current picture in reference picture list L1.

In this case, reference picture list L0 may be constructed by sequentially including short-term reference picture(s) prior to the current picture, inter-layer reference picture ILRPi, short-term reference picture(s) subsequent to the current picture, a long-term reference picture, and inter-layer reference picture ILRPj. Reference picture list L1 may be constructed by sequentially including short-term reference picture(s) subsequent to the current picture, inter-layer reference picture ILRPj, short-term reference picture(s) prior to the current picture, a long-term reference picture, and inter-layer reference picture ILRPi.

Further, one of the two inter-layer reference pictures may be an inter-layer reference picture derived from a resolution scalable layer, and the other may be an inter-layer reference picture derived from a layer providing a different view. In this case, for instance, when ILRPi is an inter-layer reference picture derived from a layer providing a different level of resolution and ILRPj is an inter-layer reference picture derived from a layer providing a different view, in scalable video coding supporting only other scalabilities than view scalability, reference picture list L0 may be constructed by sequentially including short-term reference picture(s) prior to the current picture, inter-layer reference picture ILRPi, short-term reference picture(s) subsequent to the current picture and a long-term reference picture, and reference picture list L1 may be constructed by sequentially including short-term reference picture(s) subsequent to the current picture, short-term reference picture(s) prior to the current picture, a long-term reference picture, and inter-layer reference picture ILRPi.

Meanwhile, in inter-layer prediction, as information on the inter-layer reference picture, only a sample value may be used, only motion information (motion vector) may be used, or both a sample value and motion information may be used. When a reference picture index indicates the inter-layer reference picture, the prediction module 110 may use only the sample value of the inter-layer reference picture, only the motion information (motion vector) on the inter-layer reference picture, or both the sample value of the inter-layer reference picture and the motion information on the inter-layer reference picture depending on information received from the encoder.

When only the sample value of the inter-layer reference picture is used, the prediction module 110 may derive samples of a block specified by the motion vector in the inter-layer reference picture as a predicted sample of the current block. In scalable video coding which does not consider a view, a motion vector in inter prediction using an inter-layer reference picture (inter-layer prediction) may be set to a fixed value (for example, 0).

When only the motion information on the inter-layer reference picture is used, the prediction module 110 may use a motion vector specified in the inter-layer reference picture as a motion vector predictor for deriving a motion vector of the current block. Further, the prediction module 110 may use the motion vector specified in the inter-layer reference picture as the motion vector of the current block.

When both the sample of the inter-layer reference picture and the motion information on the inter-layer reference picture are used, the prediction module 110 may use a sample in a region corresponding to the current block in the inter-layer reference picture and motion information (motion vector) specified in the inter-layer reference picture for prediction of the current block.

When inter-layer prediction is applied, the encoder may transmit the reference index indicating the inter-layer reference picture in the reference picture list to a decoder, and also transmit information specifying which information (sample information, motion information or both sample information and motion information) on the inter-layer reference picture the encoder uses, that is, information specifying the type of dependency between two layers in inter-layer prediction, to the decoder.

The transform/quantization modules 115 and 145 may transform the residual block by TU to create transform coefficients and may quantize the transform coefficients.

A transform block is a rectangular block of samples to which the same transformation is applied. The transform block may be a TU and may have a quad-tree structure.

The transform/quantization modules 115 and 145 may perform transformation based on a prediction mode applied to the residual block and a size of the transform block and a size of the transform block to create a two-dimensional (2D) array of transform coefficients. For example, when intra prediction is applied to the residual block and the residual block has a 4×4 array, the residual block may be transformed using discrete sine transform (DST). Otherwise, the residual block may be transformed using discrete cosine transform (DCT).

The transform/quantization modules 115 and 145 may quantize the transform coefficients to create the quantized transform coefficients.

The transform/quantization modules 115 and 145 may transmit the quantized transform coefficients to the entropy coding modules 130 and 160. Here, the transform/quantization modules 115 and 145 may rearrange the 2D array of the quantized transform coefficients into a one-dimensional (1D) array in a predetermined scan order and may transmit the rearranged 1D array to the entropy coding modules 130 and 160. The transform/quantization modules 115 and 145 may transmit a reconstructed block generated on the basis of the residual block and the predicted block to the filtering modules 120 and 150 for inter prediction, without being transformation/quantization.

If necessary, the transform/quantization modules 115 and 145 may skip transformation and perform only quantization or may skip both transformation and quantization. For example, the transform/quantization modules 115 and 165 may skip transformation for a block involving a specific prediction method or having a specific size, or a block involving a specific prediction block and having a specific size.

The entropy coding modules 130 and 160 may perform entropy encoding on the quantized transform coefficients. An encoding method, such as exponential Golomb coding and context-adaptive binary arithmetic coding (CABAC), may be used for entropy encoding.

The filtering modules 120 and 150 may apply a deblocking filter, an adaptive loop filter (ALF), or a sample adaptive offset (SAO) to a reconstructed picture.

The deblocking filter may remove a block distortion generated on boundaries between blocks in the reconstructed picture. The ALF may perform a filtering process on the basis of a resulting value of comparing the original picture with the reconstructed picture of which the blocks are filtered by the deblocking filter. The SAO may reconstruct an offset difference by pixel between the residual block having been subjected to the deblocking filter and the original picture and is applied in a form of a band offset, an edge offset, or the like.

The filtering modules 120 and 150 may not apply all of the deblocking filter, the ALF and the SAO, but may apply only the deblocking filter, may apply only the deblocking filter and the ALF, or may apply only the deblocking filter and the SAO.

The DPBs 125 and 155 may receive and store the reconstructed block or the reconstructed picture from the filtering modules 125 and 150. The DPB 125 and 155 may provide the reconstructed block or picture to the prediction modules 110 and 140 that perform inter prediction.

Information output from the entropy coding module 160 for layer 0 and information output from the entropy coding module 130 for layer 1 may be multiplexed by the MUX 165 and may be output as a bitstream.

Although the encoding module 105 for layer 1 has been described to include the MUX 165 for convenience, the MUX may be a device or module independent of the encoding module 105 for layer 1 and the encoding module 135 for layer 0.

Further, although it has been described that scalable video coding is performed in a multilayer structure including two layers, the present invention is not limited thereto. For example, the encoder of FIG. 1 may also be applied to a multilayer structure including two or more layers. When the encoder is applied to a multilayer structure including N layers, layer 0 and layer 1 of FIG. 1 may be two layers having a reference relationship among the N layers.

Here, the encoder may transmit information specifying the reference relationship between the two layers to the decoder. For example, when the two layers have a dependent relationship in inter-layer prediction, the encoder may transmit direct_dependency_flag[L][M]. When direct_dependency_flag[L][M] is 1, an Lth layer may be predicted by referring to an Mth layer.

Figure 2:
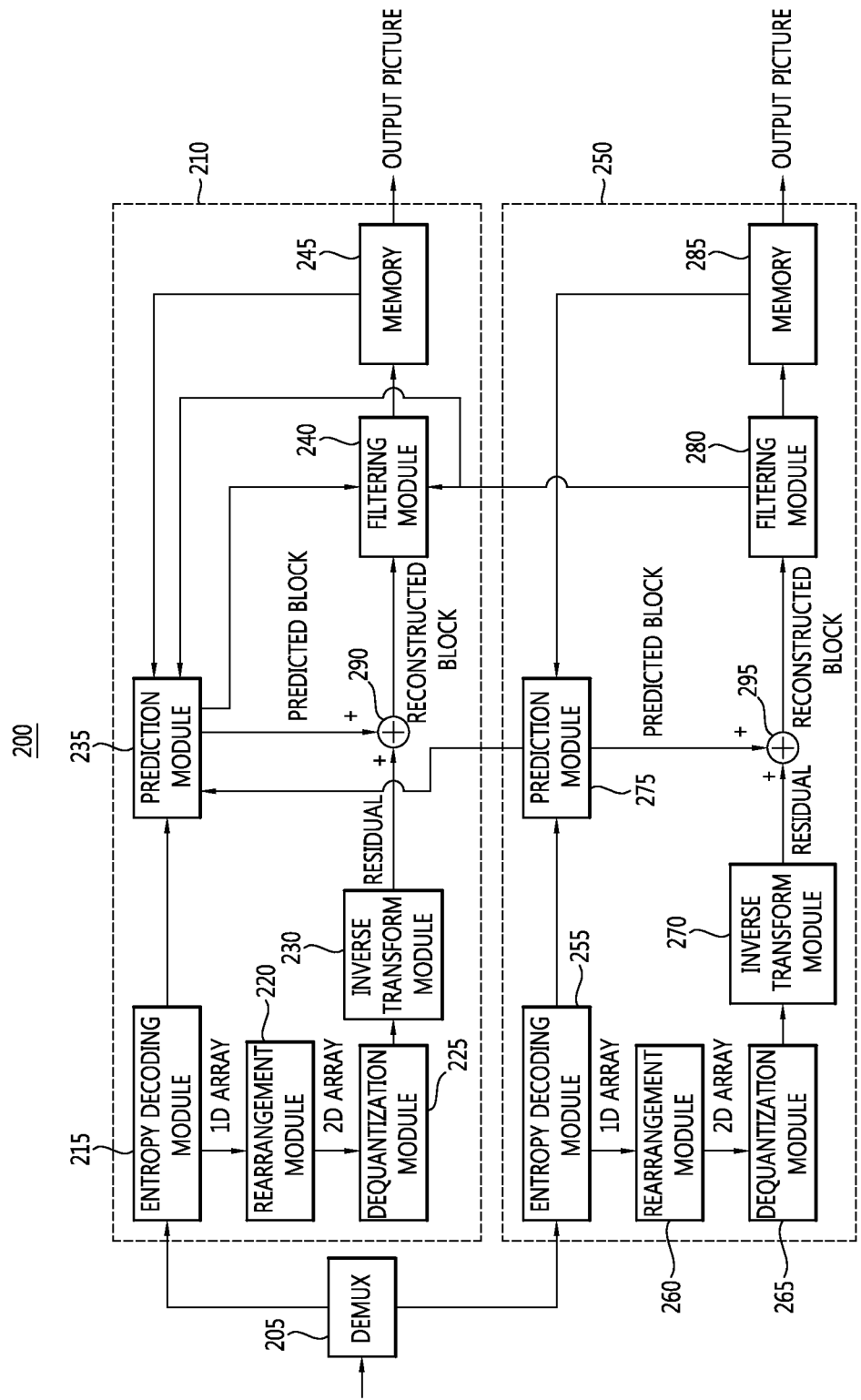
FIG. 2 is a block diagram illustrating an example of inter-layer prediction in an encoder which performs scalable coding according to the present invention.

FIG. 2 is a block diagram illustrating an example of inter-layer prediction in an encoder which performs scalable coding according to the present invention.

Referring to FIG. 2, the video decoder 200 includes a decoding module 210 for layer 1 and a decoding module 250 for layer 0.

Layer 0 may be a base layer, a reference layer or a lower layer, and layer 1 may be an enhancement layer, a current layer or an upper layer.

The decoding module 210 for layer 1 may include an entropy decoding module 215, a rearrangement module 220, a dequantization module 225, an inverse transform module 230, a prediction module 235, a filtering module 240, and a memory.

The decoding module 250 for layer 0 may include an entropy decoding module 255, a rearrangement module 260, a dequantization module 265, an inverse transform module 270, a filtering module 280, and a memory 285.

When a bitstream including image information is transmitted from the video encoder, a demultiplexer (DEMUX) 305 may demultiplex the information by layers and may transmit the information to decoders by layers.

The entropy decoding modules 215 and 255 may perform entropy decoding corresponding to an entropy coding method used in the video encoder. For example, when CABAC is used in the video encoder, the entropy decoding modules 215 and 255 may perform entropy decoding using CABAC.

Information for constructing a predicted block out of information decoded by the entropy decoding modules 215 and 255 may be provided to the prediction modules 235 and 275, and residual values entropy-decoded by the entropy decoding modules 215 and 255, that is, quantized transform coefficients, may be input to the rearrangement modules 220 and 260.

The rearrangement modules 220 and 260 may rearrange the information of the bitstream entropy-decoded by the entropy decoding modules 215 and 255, that is, the quantized transform coefficients, on the basis of a rearrangement method used in the video encoder.

For example, the rearrangement modules 220 and 260 may rearrange a 1D array of the quantized transform coefficients back into a 2D array of coefficients. The rearrangement modules 220 and 260 may perform scanning on the basis of a prediction mode applied to a current block (transform block) and/or a size of the transform block to construct a 2D array of coefficients (quantized transform coefficients).

The dequantization modules 225 and 265 may perform dequantization on the basis of a quantization parameter transmitted from the video encoder and the rearranged coefficients of the block to create transform coefficients.

The dequantization modules 225 and 265 may transmit the entropy-decoded residual values to the inverse transform modules 230 and 270, without dequantizing the residual values, depending on a predetermined condition or depending on a quantization method used for the video encoder.

In the video encoder, DCT and/or DST may be selectively performed depending on a plurality of information pieces, such as a prediction method, a size of a current block and a prediction direction, and the inverse transform modules 230 and 270 of the video decoder may perform inverse transformation on the basis of transform information used by the video decoder.

For example, the inverse transform modules 230 and 270 may perform inverse DCT and inverse DST depending on a prediction mode/block size. Specifically, the inverse transform modules 230 and 270 may perform inverse DST on a 4×4 luma block to which intra prediction has been applied.

Alternatively, the inverse transform modules 230 and 270 may fixedly use a specific inverse transformation method regardless of a prediction mode/block size. For example, the inverse transform modules 230 and 270 may apply only inverse DST to all transform blocks. The inverse transform modules 230 and 270 may also apply only inverse DCT to all transform blocks.

The inverse transform modules 230 and 270 may inversely transform the transform coefficients or a block of the transform coefficients to construct a residual signal or a residual block.

The inverse transform modules 230 and 270 may skip transformation if necessary or depending on an encoding method used for the video encoder. For example, the inverse transform modules 230 and 270 may skip transformation for a block involving a specific prediction method or having a specific size, or a block involving a specific prediction block and having a specific size.

The prediction modules 235 and 275 may construct a predicted block of the current block on the basis of predicted block construction information provided from the entropy decoding modules 215 and 255 and information on a previously decoded block and/or picture provided from the memories 245 and 285.

When a prediction mode for the current block is an intra prediction mode, the prediction modules 235 and 275 may perform intra prediction on the current block on the basis of information on a pixel in a current picture.

When the prediction mode for the current block is an inter prediction mode, the prediction modules 235 and 275 may perform inter prediction on the current block on the basis of information included in at least one of a previous picture and a subsequent picture of the current picture. Part or all of motion information necessary for inter prediction may be derived based on information received from the video encoder.

When the skip mode is used as an inter prediction mode, the residual may not be transmitted from the video encoder and the predicted block may be used as a reconstructed block.

The prediction module 235 for layer 1 may perform inter prediction or intra prediction using only information in layer 1 and may perform inter-layer prediction using information on another layer (layer 0).

Information on a current layer predicted using information on another layer (that is, predicted by inter-layer prediction) may be at least one of a texture, motion information, unit information, and a predetermined parameter (for example, a filtering parameter).

The information on another layer information used for prediction of the current layer (that is, used for inter-layer prediction) may be at least one of a texture, motion information, unit information, and a predetermined parameter (for example, a filtering parameter).

In inter-layer prediction, a current block is a block in a current picture in a current layer (layer 1 in FIG. 2), which may be a block to be decoded. A reference block is a block in a picture (reference picture) belonging to the same access unit (AU) as the picture (current picture) including the current block, which may be a block corresponding to the current block in a layer (reference layer, layer 0 in FIG. 2) which is referred to in prediction of the current block.

An example of inter-layer prediction includes inter-layer motion prediction which predicts motion information on a current layer using motion information on a reference layer. According to inter-layer motion prediction, motion information on a current block may be predicted using motion information on a reference block.

When inter-layer motion prediction is applied, the prediction module 235 may scale and use motion information on a reference layer.

As another example of inter-layer prediction, inter-layer texture prediction may use a texture of a reconstructed reference block as the predictive value of a current block. Here, the prediction module 235 may scale the texture of the reference block by upsampling.

As still another example of inter-layer prediction, inter-layer unit information prediction may derive unit (CU, PU and/or TU) information on a reference layer to use as unit information on a current layer, or determine unit information on the current layer based on unit information on the reference layer.

Unit information may include information in each unit level. For instance, CU information may include information on partition (CU, PU and/or TU), information on transformation, information on prediction, and information on coding. PU information may include information on PU partition and information on prediction (for example, motion information and information on a prediction mode). TU information may include information on TU partition and information on transformation (transform coefficients and transform methods).

As yet another example of inter-layer prediction, inter-layer parameter prediction may reuse a derived parameter of a reference layer for a current layer or predict a parameter for the current layer based on the parameter used for the reference layer.

As still another example of inter-layer prediction, inter-layer residual prediction may predict a residual of a current layer using residual information on another layer and predict a current block based on the residual of the current layer.

As yet another example of inter-layer prediction, inter-layer differential prediction may predict a current block using a differential between pictures obtained by upsampling or downsampling a reconstructed picture in a current layer and a reconstructed picture in a reference layer.

As still another example of inter-layer prediction, inter-layer syntax prediction may predict or generate a texture of a current block using syntax information on a reference layer. Here, the syntax information on the reference layer used for reference may include information on an intra prediction mode and motion information.

A plurality of inter-layer prediction methods among the afore-described methods may be used in prediction of a particular block.

Although inter-layer texture prediction, inter-layer motion prediction, inter-layer unit information prediction, inter-layer parameter prediction, inter-layer residual prediction, inter-layer differential prediction, and inter-layer syntax prediction have been described as examples of inter-layer prediction, inter-layer prediction applicable to the present invention is not limited thereto.

For instance, inter-layer prediction may be applied as an extension of inter prediction for a current layer. That is, a reference picture derived from a reference layer may be included in reference pictures available for reference in inter prediction of a current block to conduct inter prediction of the current block.

The prediction module 235 may perform inter-layer prediction using an inter-layer reference picture when a reference picture index received from an encoder or derived from a neighboring block indicates the inter-layer reference picture in a reference picture list. For example, when the reference picture index indicates the inter-layer reference picture, the prediction module 235 may derive the sample value of a region specified by a motion vector in a reference picture as a predicted block of the current block.

In this case, an inter-layer reference picture may be included in a reference picture list for the current block. The prediction module 235 may perform inter prediction of the current block using the inter-layer reference picture.

Here, the inter-layer reference picture may be a reference picture constructed by sampling a reconstructed picture in the reference layer to correspond to the current layer. Thus, when the reconstructed picture in the reference layer corresponds to a picture in the current layer, the reconstructed picture in the reference layer may be used as an inter-layer reference picture without sampling. For instance, when samples of the reconstructed picture in the reference layer and the reconstructed picture in the current layer have the same width and height and offsets between the picture in the reference layer and the picture in the current layer at the top left, top right, bottom left and bottom right are 0, the reconstructed picture in the reference layer may be used as an inter-layer reference picture for the current layer without being subjected to sampling.

The reconstructed picture in the reference layer from which the inter-layer reference picture is derived may belong to the same AU as the current picture to be encoded. When inter prediction of the current block is performed with the reference picture list including the inter-layer reference picture, the position of the inter-layer reference picture in the reference picture list may vary in reference picture lists L0 and L1. For instance, in reference picture list L0, the inter-layer reference picture may be positioned subsequent to short-term reference pictures prior to the current picture. In reference picture list L1, the inter-layer reference picture may be positioned last.

Here, reference picture list L0 is a reference picture list used for inter prediction of a P slice or used as a first reference picture list in inter prediction of a B slice. Reference picture list L1 is a second reference picture list used in inter prediction of the B slice.

Thus, reference picture list L0 may be constructed by sequentially including short-term reference picture(s) prior to the current picture, the inter-layer reference picture, short-term reference picture(s) subsequent to the current picture, and a long-term reference picture. Reference picture list L1 may be constructed by sequentially including short-term reference picture(s) subsequent to the current picture, short-term reference picture(s) prior to the current picture, a long-term reference picture, and the inter-layer reference picture.

Here, a P slice is a slice to be subjected to intra prediction or to inter prediction using at most one motion vector per prediction block and a reference picture index. A B slice is a slice to be subjected to intra prediction or to prediction using at most two motion vectors per prediction block and a reference picture index. Further, an I slice is a slice subjected only to intra prediction.

When inter prediction of the current block is performed based on the reference picture list including the inter-layer reference picture, the reference picture list may include a plurality of inter-layer reference pictures derived from a plurality of layers.

When the reference picture list includes a plurality of inter-layer reference pictures, the inter-layer reference pictures may be arranged in an interchanged manner in L0 and L1. For example, suppose that two inter-layer reference pictures, inter-layer reference picture ILRPi and inter-layer reference picture ILRPj, are included in the reference picture list used for inter prediction of the current block. In this case, ILRPi may be positioned subsequent to short-term reference pictures prior to the current picture and ILRPj may be positioned last in reference picture list L0. Also, ILRPi may be positioned last and ILRPj may be positioned subsequent to short-term reference pictures prior to the current picture in reference picture list L1.

In this case, reference picture list L0 may be constructed by sequentially including short-term reference picture(s) prior to the current picture, inter-layer reference picture ILRPi, short-term reference picture(s) subsequent to the current picture, a long-term reference picture, and inter-layer reference picture ILRPj. Reference picture list L1 may be constructed by sequentially including short-term reference picture(s) subsequent to the current picture, inter-layer reference picture ILRPj, short-term reference picture(s) prior to the current picture, a long-term reference picture, and inter-layer reference picture ILRPi.

Further, one of the two inter-layer reference pictures may be an inter-layer reference picture derived from a resolution scalable layer, and the other may be an inter-layer reference picture derived from a layer providing a different view. In this case, for instance, when ILRPi is an inter-layer reference picture derived from a layer providing a different level of resolution and ILRPj is an inter-layer reference picture derived from a layer providing a different view, in scalable video coding supporting only other scalabilities than view scalability, reference picture list L0 may be constructed by sequentially including short-term reference picture(s) prior to the current picture, inter-layer reference picture ILRPi, short-term reference picture(s) subsequent to the current picture and a long-term reference picture, and reference picture list L1 may be constructed by sequentially including short-term reference picture(s) subsequent to the current picture, short-term reference picture(s) prior to the current picture, a long-term reference picture, and inter-layer reference picture ILRPi.

Meanwhile, in inter-layer prediction, as information on the inter-layer reference picture, only a sample value may be used, only motion information (motion vector) may be used, or both a sample value and motion information may be used. When a reference picture index indicates the inter-layer reference picture, the prediction module 235 may use only the sample value of the inter-layer reference picture, only the motion information (motion vector) on the inter-layer reference picture, or both the sample value of the inter-layer reference picture and the motion information on the inter-layer reference picture depending on information received from the encoder.

When only the sample value of the inter-layer reference picture is used, the prediction module 235 may derive samples of a block specified by the motion vector in the inter-layer reference picture as a predicted sample of the current block. In scalable video coding which does not consider a view, a motion vector in inter prediction using an inter-layer reference picture (inter-layer prediction) may be set to a fixed value (for example, 0).

When only the motion information on the inter-layer reference picture is used, the prediction module 235 may use a motion vector specified in the inter-layer reference picture as a motion vector predictor for deriving a motion vector of the current block. Further, the prediction module 235 may use the motion vector specified in the inter-layer reference picture as the motion vector of the current block.

When both the sample of the inter-layer reference picture and the motion information on the inter-layer reference picture are used, the prediction module 235 may use a sample in a region corresponding to the current block in the inter-layer reference picture and motion information (motion vector) specified in the inter-layer reference picture for prediction of the current block.

The decoder may receive the reference index indicating the inter-layer reference picture in the reference picture list from the encoder and perform inter-layer prediction based on the reference index. Also, the decoder may receive information specifying which information (sample information, motion information or both sample information and motion information) on the inter-layer reference picture the decoder uses, that is, information specifying the type of dependency between two layers in inter-layer prediction, from the encoder.

Adders 290 and 295 may construct a reconstructed block using the predicted block constructed by the prediction modules 235 and 275 and the residual block constructed by the inverse transform modules 230 and 270. In this case, the adders 290 and 295 may be considered as separate modules (reconstructed block constructing module) that construct a reconstructed block.

The block and/or picture reconstructed by the adders 290 and 295 may be supplied to the filtering modules 240 and 280.

Referring to FIG. 2, the filtering module 240 for layer 1 may perform a filtering operation on the reconstructed picture using the parameter information transmitted from the prediction module 235 for layer 1 and/or the filtering module 280 for layer 1. For example, the filtering module 240 for layer 1 may perform a filtering operation on layer 1 or an inter-layer filtering operation using a parameter predicted from a filtering parameter applied to layer 0.

The memories 245 and 285 may store the reconstructed block or picture for use as a reference picture or reference block. The memories 245 and 285 may output the reconstructed picture stored in the memories 245 and 285 via a predetermined output module (not shown) or a display (not shown).

Although FIG. 2 illustrates the rearrangement modules, the dequantization modules and the inverse transform modules as independent modules, the video decoder may also be configured to enable the dequantization/inverse transform modules as a single module to sequentially perform rearrangement, dequantization, and inverse transform like the video encoder of FIG. 1.

Further, although it has been described that scalable video decoding is performed in a multilayer structure including two layers, the present invention is not limited thereto. For example, the decoder of FIG. 2 may also be applied to a multilayer structure including two or more layers. When the encoder is applied to a multilayer structure including N layers, layer 0 and layer 1 of FIG. 2 may be two layers having a reference relationship among the N layers.

Here, the decoder may receive information specifying the reference relationship between the two layers from the encoder. For example, when the two layers have a dependent relationship in inter-layer prediction, the decoder may receive direct_dependency_flag[L][M]. When direct_dependency_flag[L][M] is 1, an Lth layer may be predicted by referring to an Mth layer.

Although FIGS. 1 and 2 illustrate the prediction modules, the prediction module for layer 1 may include an inter-layer prediction module that performs a prediction process using information on another layer (layer 0) and an inter/intra prediction module that performs a prediction process without using information on another layer (layer 0).

In encoding and decoding of a video supporting a plurality of layers in a bitstream, that is, scalable coding, there are strong correlations among the plurality of layers. Thus, when prediction is performed using the correlations, redundant elements of data may be removed and video encoding performance may be enhanced.

A plurality of layers may be different from one another in at least one of resolution, frame rate, color format and view. Thus, upsampling or downsampling for adjusting resolution may be performed to use information on another layer in inter-layer prediction.

Inter-layer dependency between different layers indicates whether a block/picture in one layer is decoded by referring to a block/picture in another layer. Thus, in a multilayer structure, when there is dependency between a current layer and a reference layer, the current layer may be predicted by referring to the reference layer. A "layer" may be a representation of a coding dimension. A coding dimension may include scalability (for example, spatial scalability, temporal scalability and quality scalability), a view and a depth coding representation. It is regarded that inter-layer dependency is considered when inter-layer prediction is applied, without being limited thereto. For example, inter-layer dependency may also be considered in inter-layer intra prediction, inter-layer motion prediction, inter-layer syntax prediction, inter-layer residual prediction and inter-layer unit prediction which are described above.

As described in the examples of FIG. 1 and FIG. 2, a decoder and an encoder may perform inter prediction on a current block of a current layer in a multi-layer structure supporting scalability. In this case, the prediction on the current block may be performed in a prediction module(s) of the encoder and decoder.

The prediction module may perform prediction on the current block by using a reference picture in the current layer, and may perform prediction on the current block by using a picture of the reference layer other than the current layer.

The prediction module of the encoder and decoder may decide whether an encoding/decoding target block (e.g., current CU) of the current layer belongs to an I-slice to which only intra prediction is applied, and if it is the I-slice, may apply the intra prediction, and if it is not the I-slice, may determine a prediction mode to be applied to the current block.

In this case, the encoder may determine a prediction method to be applied to the current block through RDO or the like, and may transmit information indicating the determined prediction method to the decoder. The prediction module of the decoder and encoder may perform prediction according to the determined prediction method, and may derive a prediction sample for the current block.

For example, the prediction module may determine whether a skip mode (CU_skip) is applied to the current block (e.g., current CU). The prediction module may determine whether the skip mode is applied to the current block on the basis of a flag for indicating whether the skip mode is applied.

If the skip mode is not applied to the current block, the prediction module may determine whether inter prediction or intra prediction is applied to the current block. The prediction module may determine whether the inter prediction or intra prediction is applied to the current block on the basis of a prediction mode flag for indicating whether the inter prediction or intra prediction is applied. For example, if the prediction mode flag (pred_mode_flag) for indicating whether the inter prediction or intra prediction is performed indicates that the intra prediction is performed, the prediction module may apply the intra prediction to the current block. In addition, if the prediction mode flag indicates that the inter prediction is performed, the prediction module may apply the inter prediction to the current block.

If the inter prediction is applied, the prediction module may apply a merge mode to the current block. In the merge mode, an inter prediction parameter (motion information required for the inter prediction) for the current block (e.g., current PU) is inferred from an inter-predicted block neighboring to the current block.

In this case, neighboring blocks used to predict the current block include a current bock's spatial neighboring block and temporal neighboring block. The spatial neighboring block implies a neighboring block which resides in the same picture as the current block. The temporal neighboring block implies a block corresponding to the current block in a different picture than the current block. When the motion information of the temporal neighboring block is used as the motion information of the current block, a value of the motion information may be set to a specific value.

When the merge mode is applied, motion information of any one block among neighboring blocks of the current block may be used as the motion information of the current block either directly or with modification. For example, when the motion information of the temporal neighboring block is used as the motion information of the current block, a value of a reference picture index may be set to 0.

Meanwhile, in case of video coding supporting scalability in the multi-layer structure, the neighboring block used in the merge mode may include a block of a reference layer corresponding to the current block.

When inter prediction is applied, the prediction module may also apply a motion vector prediction mode to the current block. In the motion vector prediction mode, a motion vector of any one block among neighboring blocks of the current block (e.g., current PU) is used as a motion vector predictor of the current block.

Also in this case, neighboring blocks used to predict the current block include a current block's spatial neighboring block and temporal neighboring block. Meanwhile, in case of video coding supporting scalability in the multi-layer structure, the neighboring block used in the motion vector prediction mode may include a block of a reference layer corresponding to the current block.

Hereinafter, a method of predicting a current block of a current layer and a method of reconstructing a current picture in the video encoder and video decoder of FIG. 1 and FIG. 2 will be described in greater detail.

In this case, the current block may be an encoding unit block (e.g., coding unit (CU)) as a target of encoding/decoding, and may be a prediction unit block (e.g., prediction unit (PU)) as a derivation unit of a prediction sample.

As described above, when the inter prediction is applied to the current block, the prediction module may determine whether to apply the merge mode or a motion vector prediction (MVP) mode to the current block.

When the inter prediction is applied to the current block, the prediction module requires motion information (e.g., temporal motion information) of a block (i.e., temporal candidate block) belonging to a different picture of the same layer as the current block. Since the temporal motion information is also information of a different picture than a current encoding/decoding target picture, there is a need to store and optionally access to the temporal motion information.

In this case, motion information may include, for example, at least one of a motion vector, a prediction direction (L0, L1, bi), and a reference picture index. The stored information may be utilized as the temporal motion information when the merge mode or the MVP mode is applied. For example, the prediction module may add the motion vector and reference picture index of the temporal candidate block to a merge candidate list (in this case, the prediction module may set the motion information of the temporal candidate block to a specific value). In addition, the prediction module may add the motion vector of the temporal candidate block to an MVP candidate list.

Meanwhile, the prediction module for predicting a current layer's block (i.e., current block) in a multi-layer structure supporting scalability may derive a prediction sample of the current block on the basis of information of the reference layer other than the current layer. That is, inter-layer prediction may be applied.

Also in this case, in order for the prediction module to predict the current block on the basis of the information of the reference layer (e.g., base layer), motion information of the reference layer is required. Therefore, the motion information of the reference layer must be stored and the stored information must be accessible.

Accordingly, when the inter-layer prediction is applicable, the temporal motion information may not be used in order to decrease a memory size for storing the motion information and the number of times of memory accesses. For example, when the inter-layer prediction is applied, prediction of the temporal motion vector may not be used in the MVP mode, or the temporal motion information may be excluded from the merge candidate list in the merge mode. In this case, instead of the unused temporal motion information, information of the reference layer may be used when the inter-layer prediction is applicable.

Whether the inter-layer prediction is usable may be signaled from the encoder to the decoder.

Table 1 relates to a syntax structure showing an example of information indicating availability of inter-layer prediction according to the present invention.

TABLE 1

| slice_segment_header( ) { | Descriptor |
|---|---|
| ... | |
| if( nuh_layer_id > 0 && !all_ref_layers_active_flag | |
| && NumDirectRefLayers[ nuh_layer_id ] > | |
| 0 ) { | |
| inter_layer_pred_enabled_flag | u(1) |
| if( inter_layer_pred_enabled_flag && | |
| NumDirectRefLayers[ nuh_layer_id ] > 1) { | |
| if( !max_one_active_ref_layer_flag ) | |
| num_inter_layer_ref_pics_minus1 | u(v) |
| if( NumActiveRefLayerPics != | |
| NumDirectRefLayers[ nuh_layer_id ] ) | |
| for( i = 0; i < NumActiveRefLayerPics; i++ ) | |
| inter_layer_pred_layer_idc[ i ] | u(v) |
| ... | |

The example of Table 1 indicates that the inter-layer prediction is applicable if a value of inter_layer_pred_enabled_flag is 1, and the inter-layer prediction is not applied if the value of inter_layer_pred_enabled_flag is 0.

When the inter-layer prediction is available, the prediction module may use the information of the reference layer in replacement of information of a different picture in the same layer (i.e., temporal motion information). Instead of simply not using the temporal motion information but using the information of the reference layer, when the information of the reference layer is replaced for the temporal motion information, the information of the reference layer may be placed to a position of a temporal candidate list in the merge candidate list or the MVP candidate list.

In order to perform the inter prediction in the multi-layer structure, information indicating the inter prediction mode may be transmitted.

For example, in a case where the inter prediction is applied, when it is determined whether the inter-layer prediction is applicable in a slice level, it may be determined whether the merge mode or the MVP mode is applied for the inter prediction.

Table 2 schematically illustrates an example of a syntax structure for determining a prediction mode applied to the current block in the multi-layer structure.

TABLE 2

| coding_unit( x0, y0, log2CUSize ) { | Descriptor |
|---|---|
| if( slice_type != I ) | |
|   skip_flag[ x0 ][ y0 ] | ae(v) |
| if( skip_flag[ x0 ][ y0 ] ) | |
|   prediction_unit( x0, y0 , log2CUSize ) | |
| else if( slice_type != I \|\| log2CUSize = = Log2MinCUSize ) { | |
|   if( slice_type != I ) | |
|     pred_mode_flag | ae(v) |
|   .... | |

In the example of Table 2, the prediction module may apply a skip mode to the current block specified by (x0, y0) if a value of skip_flag is 1. If the skip mode is applied, an additional syntax element is not transmitted apart from a merge index as a merge candidate index. This will be described below.

When the skip mode is not applied, pred_mode_flag is transmitted, and the prediction module may determine whether to apply inter prediction or intra prediction to the current block specified by (x0, y0) according to a value of pred_mode_flag. For example, if the value of pred_mode_flag is 0, the inter prediction may be applied to the current block, and if the value of pred_mode_flag is 1, the intra prediction may be applied to the current block.

In order to determine a prediction mode applied to the current block, an additional syntax may be used by considering a characteristic of a multi-layer structure.

Table 3 schematically illustrates another example of a syntax structure for determining the prediction mode applied to the current block in the multi-layer structure.

TABLE 3

| coding_unit_in_scalable_extension ( x0, y0, log2CUSize ) { | Descriptor |
|---|---|
| if( inter_layer_differential_coding_enabled_flag ) | |
|   diff_coding_flag [ x0 ] [ y0 ] | ae(v) |
| if( slice_type != EI ) | |
|   skip_flag[ x0 ][ y0 ] | ae(v) |
| if ( !diff_coding_flag [x0][y0] && !skip_flag [ x0 ][ y0 ] ) { | |
|   if ( inter_layer_intra_prediction_enabled_flag \|\| inter_layer_syntax_prediction_enabled_flag ) { | |
|     base_pred_flag [ x0 ][ y0 ] | ae(v) |
|   } | |
| } | |
| if ( !base_pred_flag [ x0 ][ y0 ] ){ | |
|   if( skip_flag[ x0 ][ y0 ] ) | |
|     prediction_unit( x0, y0 , log2CUSize ) | |
|   else if( slice_type !=EI \|\| log2CUSize = = Log2MinCUSize ) { | |
|     if( slice_type !=EI ) | |

TABLE 3-continued

| coding_unit_in_scalable_extension ( x0, y0, log2CUSize ) { | Descriptor |
|---|---|
|       pred_mode_flag | ae(v) |
|   ... | |

In Table 3, base_pred_flag is transmitted as information indicating a prediction method of a base layer when information of a reference layer is used. In the example of Table 2, if a value of base_pred_flag is 1, inter-layer intra prediction or inter-layer syntax prediction is performed, and if the value of base_pred_flag is 0, the inter-layer intra prediction and the inter-layer syntax prediction are not applied.

Table 4 schematically illustrates an example of a syntax structure used to determine a specific mode of inter prediction in a prediction target block when the inter prediction is performed in the multi-layer structure.

TABLE 4

| prediction_unit( x0, y0, nPbW, nPbH ) { | Descriptor |
|---|---|
| if( cu_skip_flag[ x0 ][ y0 ] ) { | |
|   if( MaxNumMergeCand > 1 ) | |
|     merge_idx[ x0 ][ y0 ] | ae(v) |
| } else { /* MODE_INTER */ | |
|   merge_flag[ x0 ][ y0 ] | ae(v) |
|   if( merge_flag[ x0 ][ y0 ] ) { | |
|     if( MaxNumMergeCand > 1 ) | |
|       merge_idx[ x0 ][y0 ] | ae(v) |
|   } else { | |
|     if( slice_type = = B ) | |
|       inter_pred_idc[ x0 ][ y0 ] | ae(v) |
|     if( inter_pred_idc[ x0 ][ y0 ] != PRED_L1 ) { | |
|       if( num_ref_idx_l0_active_minus1 > 0 ) | |
|         ref_idx_l0[ x0 ][ y0 ] | ae(v) |
|       mvd_coding( x0, y0, 0 ) | |
|       mvp_l0_flag[ x0 ][ y0 ] | ae(v) |
|     } | |
|     if( inter_pred_idc[ x0 ][ y0 ] != PRED_L0 ) { | |
|       if (num_ref_idx_l1_active_minus1 > 0 ) | |
|         ref_idx_l1[ x0 ][ y0 ] | ae(v) |
|       if( mvd_l1_zero_flag && inter_pred_idc[ x0 ][ y0 ] = = PRED_BI ) { | |
|         MvdL1[ x0 ][ y0 ][ 0 ] = 0 | |
|         MvdL1[ x0 ][ y0 ][ 1 ] = 0 | |
|       } else | |
|         mvd_coding( x0, y0, 1 ) | |
|       mvp_l1_flag[ x0 ][ y0 ] | ae(v) |
|     } | |
|   } | |
| } | |
| } | |

After determining to apply the inter prediction in a coding unit level, an inter prediction mode for the current block may be determined by using inter prediction information included in Table 4.

In the example of Table 4, merge_flag is transmitted as information indicating whether to apply a merge mode when the inter prediction is applied. When the merge mode is applied, merge index (i.e., merge_idx) is transmitted as information indicating a specific block of which motion information is used as motion information of the current block among available candidate blocks.

In the example of Table 4, the merge index is transmitted even if the skip mode is applied. The prediction module may use motion information of a block specified by the merge index as the motion information of the current block either directly or with modification.

If the merge mode is not applied (i.e., if merge_flag=0), the prediction module may apply a motion vector prediction mode to the current block.

In the example of Table 4, inter_pred_idc indicates whether to use L0 or L1 as a reference picture list or whether to apply bi-prediction.

In case of the motion vector prediction mode, information indicating a specific block of which a motion vector is used among neighboring blocks as a motion vector predictor and information specifying a reference picture are transmitted.

In the example of Table 4, if the reference picture list L0 is used, mvp_l0_flag is information specifying the motion vector predictor, and if the reference picture list L1 is used, mvp_l1_flag is information specifying the motion vector predictor. In addition, ref idx_l0 is information specifying a reference picture for a current block in the reference picture list L0, and ref idx_l1 is information specifying a reference picture for a current block in the reference picture list L1.

The prediction module may derive a motion vector of the current block by adding the motion vector predictor and a motion vector difference (mvd) transmitted additionally. In this case, the motion vector difference may be signaled by being divided into a magnitude and a sign.

Meanwhile, information for the inter prediction mode may also be transmitted by configuring a syntax by considering the characteristic of the multi-layer structure.

Table 5 schematically illustrates another example of a syntax structure for transmitting information regarding the inter prediction mode.

TABLE 5

| prediction_unit( x0, y0, log2CUSize ) { | Descriptor |
|---|---|
|   if( skip_flag[ x0 ][ y0 ] ){ | |
|     if( MaxNumMergeCand > 1 ) | |
|       merge_idx[ x0 ][ y0 ] | ae(v) |
|   } | |
|   ... | |
|   } else { /* MODE_INTER */ | |
|     merge_flag[ x0 ] [ y0 ] | ae(v) |
|     if( merge_flag[ x0 ][ y0 ] ) { | |
|       if( MaxNumMergeCand > 1 ) | |
|         merge_idx[ x0 ][ y0 ] | ae(v) |
|     } else { | |
|       if( slice_type = = B \|\| slice_type == EB ) | |
|         inter_pred_flag[ x0 ][ y0 ] | ae(v) |
|       if( inter_pred_flag[ x0 ][ y0 ] = = Pred_LC ) { | |
|         if( num_ref_idx_lc_active_minus1 > 0) | |
|           ref_idx_lc[ x0 ][ y0 ] | ae(v) |
|         mvd_coding(mvd_lc[ x0 ][ y0 ][ 0 ], | |
|           mvd_lc[ x0 ][ y0 ][ 1 ]) | |
|         mvp_lc_flag[ x0 ][ y0 ] | ae(v) |
|       } | |
|       else { /* Pred_L0 or Pred_BI */ | |
|         if( num_ref_idx_l0_active_minus1 > 0 ) | |
|           ref_idx_l0[ x0 ][ y0 ] | ae(v) |
|         mvd_coding(mvd_l0[ x0 ][ y0 ][ 0 ], | |
|           mvd_l0[ x0 ][ y0 ][ 1 ]) | |
|         mvp_l0_flag[ x0 ][ y0 ] | ae(v) |
|       } | |
|       if( inter_pred_flag[ x0 ] [ y0 ] = = Pred_BI ) { | |
|         if( num_ref_idx_l1_active_minus1 > 0 ) | |
|           ref_idx_l1[ x0 ][ y0 ] | ae(v) |
|         mvd_coding(mvd_l1[ x0 ][ y0 ][ 0 ], | |
|           mvd_l1[ x0 ][ y0 ][ 1 ]) | |
|         mvp_l1_flag[ x0 ][ y0 ] | ae(v) |
|       } | |
|     } | |
|   } | |
| } | |

In the example of Table 5, inter_pred_flag may indicate whether to apply prediction or bi-prediction using L0 or whether to apply prediction using a combined reference picture list (i.e., combined list (LC)).

As described above, when the inter prediction is applied in the embodiment of the present invention, the prediction module may apply the merge mode or the motion vector prediction mode to the current block of the current layer.

When the merge mode is applied in the present invention, the merge mode based on the inter-layer prediction may be applied to the current block by considering the characteristic of the multi-layer structure. In addition, when the motion vector prediction mode is applied, the motion vector prediction mode based on the inter-layer prediction may be applied to the current mode in the present invention.

Hereinafter, a method of deriving a prediction sample when a motion vector prediction mode is applied in a multi-layer structure supporting scalability and a method of deriving a prediction sample when a merge mode is applied are described in that order according to the present invention.

When the merge mode is applied, a prediction module may derive a prediction sample of a current block by using motion information of a neighboring block. When the motion vector prediction mode is applied, the prediction module may derive the prediction sample of the current block on the basis of a motion vector derived by using a motion vector of the neighboring block as a motion vector predictor.

The encoder/decoder may reconstruct a current picture by adding the prediction sample and a residual.

Figure 3:
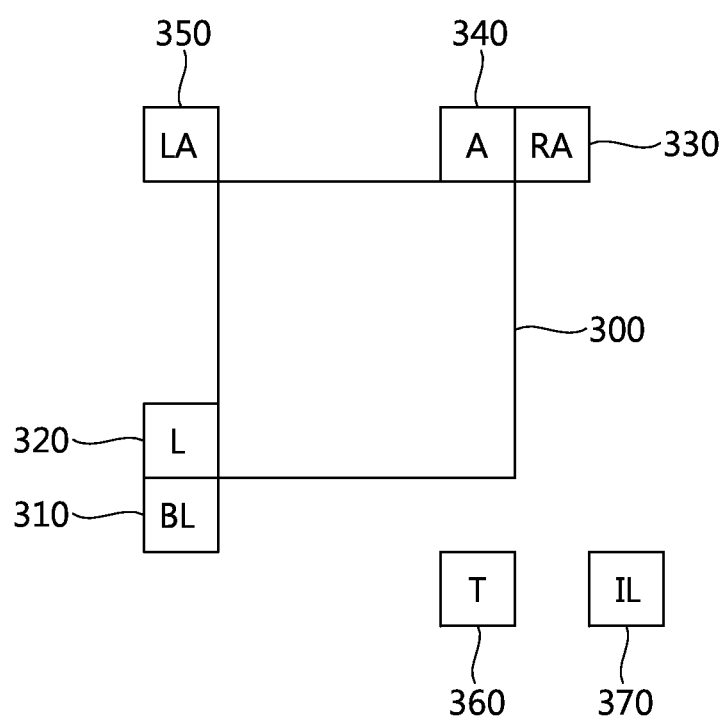
FIG. 3 schematically illustrates a method of applying a motion vector prediction mode to a current block in a multi-layer structure supporting scalability according to the present invention.

FIG. 3 schematically illustrates a method of applying a motion vector prediction mode to a current block in a multi-layer structure supporting scalability according to the present invention.

When the motion vector prediction mode (hereinafter, referred to as 'MVP mode') is applied, a prediction module may configure an MVP list consisting of candidates (i.e., a motion vector candidate or a candidate motion vector) to be used as a motion vector predictor (hereinafter, referred to as 'MVP').

In the example of FIG. 3, a BL 310 is a bottom-left neighboring block of a current block 300, an L 320 is a left neighboring block of the current block 300, an RA 330 is a right-above neighboring block of the current block 300, an A 340 is an above neighboring block of the current block 300, and an LA 350 is a left-above neighboring block of the current block 300. The BL 310, the L 320, the RA 330, the A 340, and the LA 350 may be referred to as spatial neighboring blocks in the same picture as the current block.

In addition, as a temporal neighboring block of the current block 300, a T 360 is a block corresponding to the current block 300 in a reference picture in the same layer as the current block 300. An IL 370 implies a block or picture used to predict the current block in a layer (or reference layer) different than the current block 300.

In the MVP mode, the prediction module decides an availability of candidates in order of BL 310→L 320, and decides the availability of candidates in order of RA 330→A 340→LA 350.

When the availability of candidates is decided in order of BL 310→L 320, if there is a candidate having the same reference picture as the current block as an available candidate, the prediction module may allow the candidate to be included in an MVP list (Step ①). If there is no candidate satisfying Step ①, the prediction module may scale a motion vector of a candidate first found as being available, on the basis of a picture order count (POC) difference between the current picture and a reference picture of the current picture and a POC difference between the current picture and a reference picture of the candidate (Step ②). The prediction module may allow the scaled motion vector to be included in the MVP list.

When the availability of candidates is decided in order of RA 330→A 340→LA 350, if there is a candidate having the same reference picture as the current block as an available candidate, the prediction module may allow the candidate to be included in an MVP list (Step ①). If there is no candidate satisfying Step ① and there is no available candidate between the BL 310 and the L 320, the prediction module may scale a motion vector of a candidate first found as being available, on the basis of a picture order count (POC) difference between the current picture and a reference picture of the current picture and a POC difference between the current picture and a reference picture of the candidate (Step ②). The prediction module may allow the scaled motion vector to be included in the MVP list.

Meanwhile, if inter-layer prediction is not applied to the current block as described above, the prediction module may allow a temporal motion vector to be included in an MVP candidate list.

When the temporal neighboring block T 360 is used as the motion vector candidate, a colocated picture (hereinafter, COL picture) including the T 360 may be specified by using a reference picture list. In the COL picture, motion information of a prediction block including a specific location as to the T 360 residing in the same LCU as the current block may be used as the temporal motion vector. In this case, the temporal motion vector used as the motion vector candidate may be scaled by considering the COL picture and reference pictures of the current picture.

It is assumed that A denotes an MVP candidate determined by deciding the availability of candidates in order of BL 310→L 320, B denotes an MVP candidate determined by deciding the availability of candidates in order of RA 330→A 340→LA 350, and TMVP denotes an MVP candidate determined by deciding the availability of temporal candidates.

As the inter prediction for the current block, an MVP list for a case where the inter-layer prediction is not applied may be configured as shown in Table 6 below.

TABLE 6

| MVP candidate list |
| --- |
| A |
| B |
| TMVP |
| (candidate pruning) |
| (N < maximum value) zeo motion vector |

After the available A, B, and TMVP are added to the MVP candidate list, if the A and the B are identical, the prediction module may prune one of the A and the B from the MVP candidate list.

In addition, the prediction module may adjust the number of MVP candidates in the MVP candidate list to the maximum number of candidates. For example, in a case where the maximum number of candidates of the MVP candidate list is 2, if the A, the B, and the TMVP are all available, the prediction module may configure the MVP candidate list by using the A and the B, and may prune the TMVP from the MVP candidate list.

When the number of candidates in the MVP candidate list is less than the maximum number of candidates, the prediction module may add a zero (0) motion vector as a candidate.

In the MVP candidate list, a candidate index may be assigned in order of being added to the list. For example, the candidate index may be assigned by the maximum number of candidates in order of A-B-TMVP-zero vector (e.g., 0 or 1 if the maximum number of candidates is 2).

The encoder may transmit to the decoder an MPV index indicating an MVP to be used in inter prediction for the current block on the MVP candidate list, a motion vector difference (mvd), and a reference index indicating a reference picture for the current block on a reference picture list. As a list of reference pictures that can be used in the inter prediction, the reference picture list may be L0 for forward direction prediction and L1 for backward direction prediction.

The prediction module of the decoder/encoder may generate a prediction block for the current block on the basis of an MVP indicated by an MVP index, a motion vector derived from an mvd, and a reference picture indicated by a reference index.

When the inter-layer prediction is applicable to the current block, the prediction module may allow a temporal motion vector to be excluded from the MVP candidate list, and may allow information of a reference layer to be included in the MVP candidate list.

It is assumed that the IL 370 denotes an inter-layer reference picture belonging to the same access unit (AU) as the current picture in the reference layer or an inter-layer reference block corresponding to the current block in the inter-layer reference picture.

When the inter-layer prediction is applied, the prediction module may derive a prediction sample of the current block by using a motion vector of the IL 370 or a pixel value of the IL 370.

For example, the prediction module may set a motion vector to a zero vector, and may transmit a reference picture index indicating the IL 370 as a reference picture so that samples of a region corresponding to the current block 300 in the IL 370 is used as a prediction sample for the current block 300. In this case, the samples of the region corresponding to the current block 300 in the IL 370 may be up-sampled according to the current layer (e.g., according to a resolution of the current layer).

It is assumed that A denotes an MVP candidate determined by deciding the availability of candidates in order of BL 310→L 320, B denotes an MVP candidate determined by deciding the availability of candidates in order of RA 330→A 340→LA 350, and an inter-layer motion vector predictor IL denotes a motion vector of the inter-layer reference picture 370.

An example of the MVP candidate list configured when the inter-layer prediction is applicable to the current block according to the present invention is shown Table 7 below.

TABLE 7

| MVP candidate list |
| --- |
| A |
| B |
| IL |
| (candidate pruning) |
| (N < maximum value) zeo motion vector |

After the available A, B, and IL are added to the MVP candidate list, if the A and the B are identical, the prediction module may prune one of the A and the B from the MVP candidate list.

In addition, the prediction module may adjust the number of MVP candidates in the MVP candidate list to the maximum number of candidates. For example, in a case where the maximum number of candidates of the MVP candidate list is 2, if the A, the B, and the IL are all available, the prediction module may configure the MVP candidate list by using the A and the B, and may prune the IL from the MVP candidate list.

When the number of candidates in the MVP candidate list is less than the maximum number of candidates, the prediction module may add a zero (0) motion vector as a candidate.

In the MVP candidate list, a candidate index may be assigned in order of being added to the list. For example, the candidate index may be assigned by the maximum number of candidates in order of A-B-IL-zero vector (e.g., 0 or 1 if the maximum number of candidates is 2).

The encoder may transmit to the decoder an MPV index indicating an MVP to be used in inter prediction for the current block on the MVP candidate list, a motion vector difference (mvd), and a reference index indicating a reference picture for the current block on a reference picture list. As a list of reference pictures that can be used in the inter prediction, the reference picture list may be L0 for forward direction prediction and L1 for backward direction prediction.

As described above, when the inter-layer prediction is applied, the MVP index may indicate a motion vector of the IL, and the reference index may indicate the IL as the reference picture. In this case, the motion vector of the IL may be a zero vector, and the prediction module may use the samples of the region corresponding to the current block 300 in the IL 370 as a prediction sample for the current block 300. In this case, the samples of the region corresponding to the current block 300 in the IL 370 may be up-sampled according to the current layer (e.g., according to a resolution of the current layer).

Another example of the MVP candidate list configured when the inter-layer prediction is applicable to the current block according to the present invention is shown Table 8 below.

TABLE 8

| MVP candidate list |
|---|
| IL |
| A |
| B |
| (candidate pruning) |
| (N < maximum value) zeo motion vector |

After the available A, B, and IL are added to the MVP candidate list, if the A and the B are identical, the prediction module may prune one of the A and the B from the MVP candidate list.

In addition, the prediction module may adjust the number of MVP candidates in the MVP candidate list to the maximum number of candidates. For example, in a case where the maximum number of candidates of the MVP candidate list is 2, if the A, the B, and the IL are all available, the prediction module may prune any one of the A and the B from the MVP candidate list.

When the number of candidates in the MVP candidate list is less than the maximum number of candidates, the prediction module may add a zero (0) motion vector as a candidate.

In the MVP candidate list, a candidate index may be assigned in order of being added to the list. For example, the candidate index may be assigned by the maximum number of candidates in order of IL-A-B-zero vector (e.g., 0 or 1 if the maximum number of candidates is 2).

Similarly to the case of Table 7, the encoder may transmit the MVP index, the mvd, and the reference index to the decoder.

When the inter-layer prediction is applied, the MVP index may indicate a motion vector of the IL, and the reference index may indicate the IL as the reference picture. In this case, the motion vector of the IL may be a zero vector, and the prediction module may use the samples of the region corresponding to the current block 300 in the IL 370 as a prediction sample for the current block 300. In this case, the samples of the region corresponding to the current block 300 in the IL 370 may be up-sampled according to the current layer (e.g., according to a resolution of the current layer).

Figure 4:
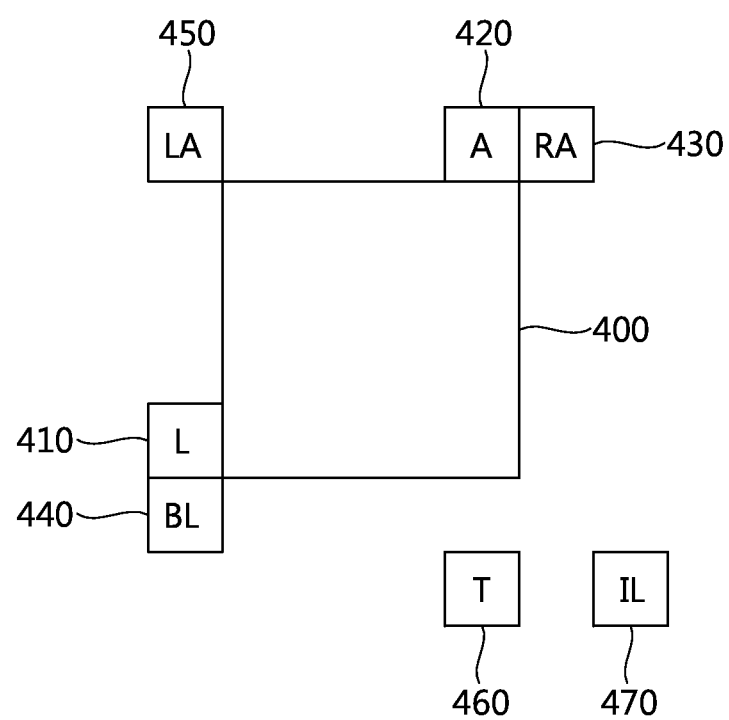
FIG. 4 schematically illustrates a method of applying a merge mode to a current block in a multi-layer structure supporting scalability according to the present invention.

FIG. 4 schematically illustrates a method of applying a merge mode to a current block in a multi-layer structure supporting scalability according to the present invention.

When the merge mode is applied, a prediction module may determine motion information to be used as motion information of the current block by configuring a merge candidate list.

In the merge mode, motion information selected on the merge candidate list consisting of motion information of neighboring blocks shown in FIG. 4 (hereinafter, referred to as a motion information candidate) may be used as the motion information of the current block. Information (merge index) indicating the motion information candidate to be used as the motion information of the current block on the merge candidate list may be transmitted from an encoder to a decoder.

When a skip mode is applied, the merge candidate list may also be configured in the same manner as a case where the merge mode is applied, and may be used to determine the motion information of the current block. For example, when the skip mode is applied, a merge index also indicates information to be used as the motion information of the current block on the merge candidate list, and when the merge mode is applied, the merge index also indicates the information to be used as the motion information of the current block on the merge candidate list. However, when the skip mode is applied, an additional syntax element is not transmitted apart from the merge index.

Similarly to the case of FIG. 3, a BL 440 is a bottom-left neighboring block of a current block 400, an L 410 is a left neighboring block of the current block 400, an RA 430 is a right-above neighboring block of the current block 400, an A 420 is an above neighboring block of the current block 400, and an LA 450 is a left-above neighboring block of the current block 400. The L 410, the A 420, the RA 430, the BL 440, and the LA 450 may be referred to as spatial neighboring blocks in the same picture as the current block.

In addition, as a temporal neighboring block of the current block 400, a T460 is a block corresponding to the current block 400 in a reference picture in the same layer as the current block 400. An IL 470 implies a block or picture used to predict the current block in a layer (or reference layer) different than the current block 400.

It is also assumed in the example of FIG. 4 that A1 denotes motion information of the L 410, B1 denotes motion information of the A 420, B0 denotes motion information of the RA 430, A0 denotes motion information of the BL 440, B2 denotes motion information of the LA 450. Further, for convenience of description, TMVP denotes motion information of the T 460, and IL denotes motion information of the IL 470.

When the merge mode or the skip mode is applied, the prediction module may decide an availability for the L 410, the BL 440, the LA 450, the A 420, and the RA 430 which are spatial candidates neighboring to the current block. The availability decision may proceed in a specific order. For example, it may proceed in order of L 410→A 420→RA 430→BL 440→LA 450.

In this case, the availability decision of each candidate may include identity decision with respect to a previous candidate. For example, as to the A 420, the availability decision may be achieved by considering whether it has the same motion information as the L 410. More specifically, if the L 410 is available and the L 410 has the same information as the A 420, it may be decided that the A 420 is not available.

In the same manner, as to the RA 430, the availability decision may be achieved by considering whether the RA 430 has the same information as the A 420. As to the BL 440, the availability decision may be achieved by considering whether the BL 440 has the same information as the L 410.

As to the LA 450, the availability decision may be achieved by considering both of whether the LA 450 has the same information as the L 410 and whether the LA 450 has the same motion information as the A 420. In this case, if all of first four candidates L, A, RA, and BL are available, it may be decided that the LA 450 is not available.

When the inter-layer prediction is not applied to the current block, the prediction module may allow a temporal motion vector to be included in an MVP candidate list, in addition to motion information of a spatial neighboring block.

When motion information of the T 460 is used as a motion information candidate, a COL picture including the T 460 may be specified by using a reference picture list. In the COL picture, motion information of a prediction block including a specific location as to a COL block in the same LCU as the current block may be used as motion information of the T 460. In this case, a motion vector of the T 460 may be scaled by considering the COL picture and reference pictures of the current picture, and a reference index of the T 460 may be set to a specific value (e.g., 0).

As candidates including the candidate T 460 and decided as being available, the merge candidate list may be configured according to an availability decision order.

As the inter prediction for the current block, a merge candidate list for a case where the inter-layer prediction is not applied may be configured as shown in Table 9 below.

TABLE 9

| merge candidate list |
|---|
| A1 |
| B1 |
| B0 |
| A0 |
| B2 (if N < 4) |
| TMVP |
| (candidate pruning) |
| (N < maximum value) combined bi-prediction candidate |
| (N < maximum value) zeo motion vector |

In the example of Table 9, the prediction module may decide an availability of motion information, and thus may allow motion information of a spatial neighboring block to be included in a merge candidate list in an orderly manner. In this case, the deciding of the availability includes deciding that the motion information is different from previous motion information as described above, and may be performed in a predetermined specific order.

In case of the B2, if all of the previous A1, B1, B0, and A1 are valid motion information, it is not included in the merge candidate list. If the TMVP which is temporal motion information is validly included, arrangement (a sort of candidate pruning) may be performed on motion information. For example, if the maximum number of candidates is 5, it does not satisfy the maximum number of candidates, and if a slice type of the current block is B, a combined bi-prediction candidate is added. Even though the combined bi-prediction candidate is added, if it does not satisfy the maximum number of candidates, a zero vector may be added to configure the merge candidate list.

An index on the merge candidate list may be assigned by the maximum number of candidates (e.g., 0, 1, 2, 3, 4 if the maximum number of candidates is 5) in order of adding the index, that is, in order of A1-B1-B0-A0-B2-TMVP-combined bi-prediction-zero motion vector in the example of Table. 9.

The prediction module may perform inter prediction by using motion information of a candidate indicated on the merge candidate list by information (e.g., merge index (merge_idx)) transmitted from the encoder as the motion information for the current block. For example, the prediction module may use samples indicated by the motion information of the candidate selected by the merge index as a prediction block of the current block.

When the inter-layer prediction is not applied to the current block, the prediction module may allow a temporal motion vector to be included in an MVP candidate list, in addition to motion information of a spatial neighboring block.

When motion information of the T 460 is used as a motion information candidate, a COL picture including the T 460 may be specified by using a reference picture list. In the COL picture, motion information of a prediction block including a specific location as to a COL block in the same LCU as the current block may be used as motion information of the T 460. In this case, a motion vector of the T 460 may be scaled by considering the COL picture and reference pictures of the current picture, and a reference index of the T 460 may be set to a specific value (e.g., 0).

As candidates including the candidate T 460 and decided as being available, the merge candidate list may be configured according to an availability decision order.

Meanwhile, an example of the merge candidate list that can be configured when the inter-layer prediction is applicable to the current block is shown in Table 10 below.

TABLE 10

| merge candidate list |
|---|
| A1 |
| B1 |
| B0 |
| A0 |
| B2 (if N < 4) |
| IL |
| (candidate pruning) |
| (N < maximum value) combined bi-prediction candidate |
| (N < maximum value) zeo motion vector |

In the example of Table 10, the prediction module may decide an availability of motion information, and thus may allow motion information of a spatial neighboring block to be included in a merge candidate list in an orderly manner. In this case, the deciding of the availability includes deciding that the motion information is different from previous motion information as described above, and may be performed in a predetermined specific order.

In case of the B2, if all of the previous A1, B1, B0, and A1 are valid motion information, it is not included in the merge candidate list.

If the IL which is inter-layer prediction information is validly included, arrangement (a sort of candidate pruning) may be performed on motion information. For example, if the maximum number of candidates is 5, it does not satisfy the maximum number of candidates, and if a slice type of the current block is B, a combined bi-prediction candidate is added. Even though the combined bi-prediction candidate is added, if it does not satisfy the maximum number of candidates, a zero vector may be added to configure the merge candidate list.

An index on the merge candidate list may be assigned by the maximum number of candidates (e.g., 0, 1, 2, 3, 4 if the maximum number of candidates is 5) in order of adding the index, that is, in order of A1-B1-B0-A0-B2-IL-combined bi-prediction-zero motion vector in the example of Table. 10.

The prediction module may perform inter prediction by using motion information of a candidate indicated on the merge candidate list by information (e.g., merge index (merge_idx)) transmitted from the encoder as the motion information for the current block. For example, the prediction module may use samples indicated by the motion information of the candidate selected by the merge index as a prediction block of the current block.

When the inter-layer prediction is applied, the merge index may indicate the IL on the merge list. In this case, the motion vector of the motion information IL may be a zero vector, and a reference index of the motion information IL may indicate a reference picture of a reference layer. The reference picture of the reference layer may be a picture belonging to the same AU as the current picture in the reference layer. That is, when it is considered that the inter-layer reference picture is a corresponding picture of the same AI as the current picture, the motion vector of the IL may be a zero vector, and the prediction module may use the samples of the region corresponding to the current block 400 in the IL 470 as a prediction sample for the current block 400. In this case, the samples of the region corresponding to the current block 400 in the IL 470 may be up-sampled according to the current layer (e.g., according to a resolution of the current layer).

The encoder/decoder may reconstruct a current picture by adding a residual for the current picture to prediction samples derived by the prediction module. For example, the prediction module may derive a prediction sample for each prediction block (e.g., PU) in the current picture, and thereafter an adder of the encoder/decoder may reconstruct the current picture by adding a prediction sample for the current picture and the residual.

Another example of the merge candidate list that can be configured when the inter-layer prediction is applicable to the current block is shown in Table 11 below.

TABLE 11

| merge candidate list |
| --- |
| IL |
| A1 |
| B1 |
| B0 |
| A0 |
| B2 (if N < 4) |

TABLE 11-continued

| merge candidate list |
| --- |
| (candidate pruning) |
| (N < maximum value) combined bi-prediction candidate |
| (N < maximum value) zeo motion vector |

In the example of Table 11, the prediction module may decide an availability of motion information, and thus may allow motion information of a spatial neighboring block to be included in a merge candidate list in an orderly manner. In this case, the deciding of the availability includes deciding that the motion information is different from previous motion information as described above, and may be performed in a predetermined specific order.

In case of the B2, if all of the previous A1, B1, B0, and A1 are valid motion information, it is not included in the merge candidate list.

If the availability for the B2 is examined, arrangement (a sort of candidate pruning) may be performed on motion information. For example, if the maximum number of candidates is 5, it does not satisfy the maximum number of candidates, and if a slice type of the current block is B, a combined bi-prediction candidate is added. Even though the combined bi-prediction candidate is added, if it does not satisfy the maximum number of candidates, a zero vector may be added to configure the merge candidate list.

An index on the merge candidate list may be assigned by the maximum number of candidates (e.g., 0, 1, 2, 3, 4 if the maximum number of candidates is 5) in order of adding the index, that is, in order of IL-A1-B1-B0-A0-B2-combined bi-prediction-zero motion vector in the example of Table. 11.

The prediction module may perform inter prediction by using motion information of a candidate indicated on the merge candidate list by information (e.g., merge index (merge_idx)) transmitted from the encoder as the motion information for the current block. For example, the prediction module may use samples indicated by the motion information of the candidate selected by the merge index as a prediction block of the current block.

When the inter-layer prediction is applied, the merge index may indicate the IL on the merge list. In this case, the motion vector of the motion information IL may be a zero vector, and a reference index of the motion information IL may indicate a reference picture of a reference layer. The reference picture of the reference layer may be a picture belonging to the same AU as the current picture in the reference layer. That is, when it is considered that the inter-layer reference picture is a corresponding picture of the same AI as the current picture, the motion vector of the IL may be a zero vector, and the prediction module may use the samples of the region corresponding to the current block 400 in the IL 470 as a prediction sample for the current block 400. In this case, the samples of the region corresponding to the current block 400 in the IL 470 may be up-sampled according to the current layer (e.g., according to a resolution of the current layer).

When the skip mode is applied or the merge mode as the inter prediction is applied, the prediction module of the encoder/decoder may use motion information indicated in the merge candidate list by the merge index as the motion information of the current block. In this case, the prediction module may use samples of a reference picture specified by the motion information indicated by the merge index as a prediction sample of the current block. In this case, the samples of the reference picture may be samples of a block corresponding to the current block in a picture belonging to the same AU as the current picture in an inter-layer, and these samples may be up-sampled according to the current layer and thereafter may be used as prediction samples.

When the MVP mode is applied, the prediction module may use a motion vector selected by an MVP candidate indicator in the MVP candidate list as a motion vector predictor (MVP) for the current block. The prediction module may derive the motion vector of the current block by adding the MVP and an additionally transmitted motion vector difference. The prediction module may use samples of a reference picture specified by a reference index for the current block and the derived motion vector as a prediction sample of the current block. In this case, the samples of the reference picture may be samples of a block corresponding to the current block in a picture belonging to the same AU as the current picture in an inter-layer, and these samples may be up-sampled according to the current layer and thereafter may be used as prediction samples.

Meanwhile, when the inter prediction is applied, as described in FIG. 1 and FIG. 2, the prediction module may derive the prediction sample for the current block by using a neighboring sample of the current block as a reference sample.

The encoder and the decoder may reconstruct the current picture by adding a residual to the prediction sample. The residual may be transmitted from the encoder to the decoder. Meanwhile, when the skip mode is applied, the prediction sample may be used as a reconstructed sample of the current block since there is no transmission of an additional syntax element in addition to the merge index.

In order to generate a reconstructed picture more similar to an original picture, a deblocking filter may be applied to an edge of each block in the reconstructed picture. Deblocking filtering may be performed in the encoder and the decoder. For example, a filtering module of FIG. 1 and FIG. 2 may perform the deblocking filtering.

The deblocking filtering is first applied to vertical edges between blocks in the current picture and thereafter is applied to horizontal edges between the blocks in the current picture. With the modified sample by deblocking filtering of vertical edges, the deblocking filtering is applied to horizontal edges in the current picture.

Figure 5:
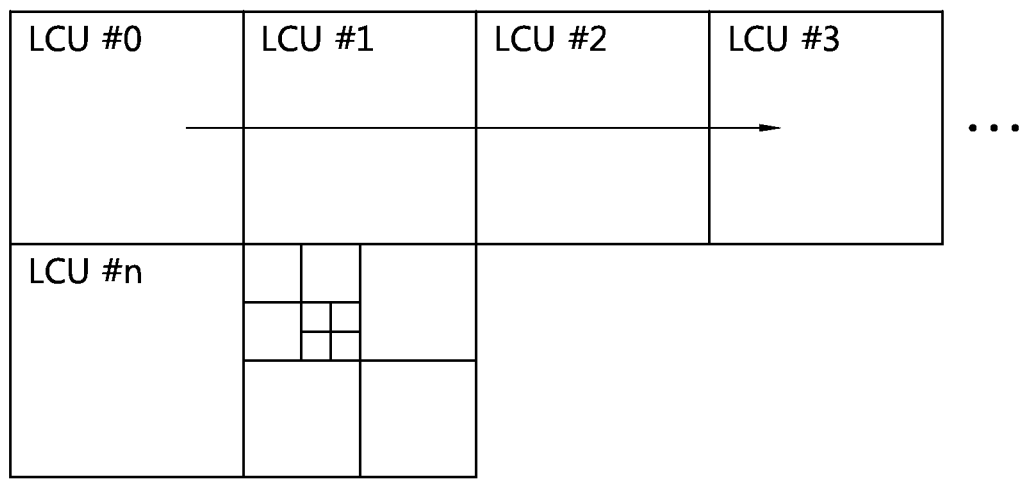
FIG. 5 schematically illustrates a method of performing deblocking filtering according to the present invention.

FIG. 5 schematically illustrates a method of performing deblocking filtering according to the present invention. Referring to FIG. 5, the deblocking filtering is performed on edges in a corresponding coding block on a coding tree unit (CTU) basis. The CTU implies a highest CU among CUs of a tree structure, and may be a largest coding unit (LCU). To facilitate easy understanding of the invention, the CTU and the LCU are used without distinction when necessary in the present specification.

As described above, a filtering module performs deblocking filtering (i.e., horizontal filtering) of vertical edges on the entirety of the current picture, and thereafter performs deblocking filtering (i.e., vertical filtering) of horizontal edges on the entirety of the current picture.

More specifically, the filtering module derives a block boundary to apply the deblocking filtering of edges between blocks. For example, the filtering module may derive a boundary for a prediction block and coding block in the LCU.

Next, the filtering module derives boundary strength (bS) of a block boundary to which a deblocking filter is applied. The deriving of the bS may be performed on a specific unit basis. For example, the bS may be derived in unit of a block having a specific size, for example, in unit of a 8×8 block or a 4×4 pixel block. Alternatively, the bS may also be derived in unit of 4 pixels with respect to a boundary of the 8×8 block.

The filtering module performs filtering on a block boundary according to the bS. The filtering module derives the bS value to 0 when the deblocking filtering is not applied, and derives the bS value to 1 or 2 when the filtering is applied. For example, when at least one of two blocks adjacent to each other with a filtering target boundary being placed therebetween is intra-coded, the filtering module may determine a bS for the filtering target boundary to 2. In addition, when it is not 'a case where at least of two blocks is not intra-coded', the filtering module may derive the bS value to 1 for a case where at least one of the two blocks includes a transform coefficient which is not 0, or has a different reference picture, or has a different motion vector, etc.

The filtering module may determine block-based filtering on/off according to the bS. For example, the filtering module may turn off the deblocking filter as to a boundary of which a bS value is 0, and may turn on the deblocking filter as to a boundary of which a bS value is 1 or 2.

The filtering module may determine whether a strong filter or a weak filter is applied to a boundary to which the deblocking filter is applied, and may perform filtering.

When the deblocking filtering operation is complete as described above, the filtering module may apply an offset to samples of a reconstructed picture. The offset may be adaptively applied to the sample. That is, whether to apply the offset, a type of the applying, etc., may be determined for each sample.

Regarding this sample adaptive offset (SAO), whether it is applicable in a sequence parameter level may be determined, and whether it is applicable may be determined on a coding tree unit (CTU) basis.

Examples of the SAO include a band offset and an edge offset. When the SAO is applied, the band offset or the edge offset may be applied on a sample basis.

The encoder may transmit, to the decoder, information indicating whether the band offset or the edge offset is applied. In this case, the encoder may indicate to perform the SAO in a current CTU by using SAO information of a previously processed CTU neighboring to the current CTU. For example, when information signaled from the encoder instructs to use SAO information of the neighboring CTU, the decoder may perform the SAO in the current CTU by directly using SAO information of a left CTU or above CTU of the current CTU.

An offset value to be applied may be signaled from the encoder to the decoder. The offset value may be determined for each CTU according to a category. In addition, the offset value may be signaled by using respective information (e.g., syntax element) indicating a magnitude and a sign.

Regarding a band offset, the offset may be applied for a sample belonging to four consecutive bands after dividing a pixel value by a band of a specific duration according to a pixel histogram. When the band offset is applied, the encoder may determine the four bands to which the band offset will be applied, and may transmit start band information indicating offsets for the four bands and a first band among the four bands (that is, indicating a location of a start band).

Figure 6:
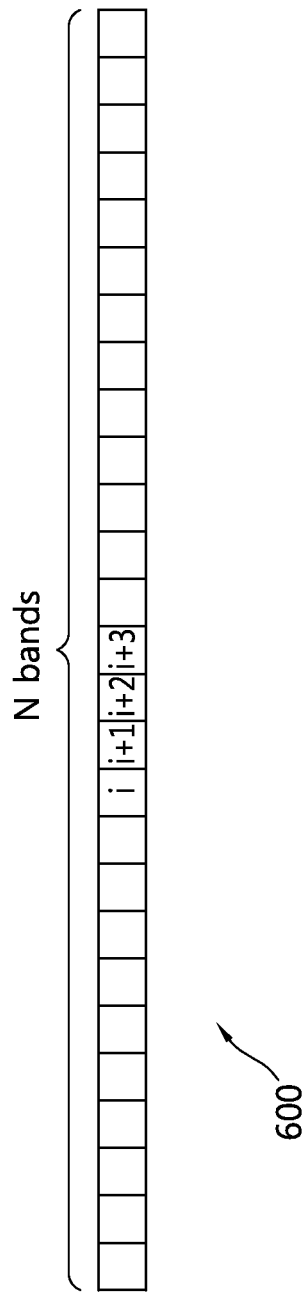
FIG. 6 schematically illustrates an example of a method of applying a band offset.

FIG. 6 schematically illustrates an example of a method of applying a band offset.

Referring to FIG. 6, a pixel value range of all pixels is equally divided into N bands.

An encoder indicates four consecutive bands i, i+1, i+2, and i+3 to which the band offset will be applied. The encoder may specify a location of a start band i to specify the four bands to which the band offset will be applied.

On the basis of received information, a decoder may specify the four consecutive bands i, i+1, i+2, and i+3 to which the band offset will be applied. The decoder may receive information specifying the start band i (i.e., start band information) from the encoder. The start band information may be transmitted at an SAO syntax level.

The decoder may specify four consecutive bands including the start band i, and may apply the band offset to a sample belonging to the specific four bands.

The offset value to be applied may be determined for each band (category). The encoder may transmit information specifying the offset value to be applied to each of the four bands to the decoder, and the decoding band may derive an offset value specified by received information for each band, and may apply an offset value corresponding to pixels belonging to each band. In this case, the offset value may be transmitted from the encoder to the decoder by being divided into information indicating a magnitude and information indicating a sign.

As to a pixel belonging to the four bands to which the band offset will be applied, The decoder may apply an offset corresponding to a band to which the pixel belongs.

An edge offset is classified into four classes according to which edge belongs to an image as a whole in a block (e.g., a CTU) to which an SAO will be applied. For example, the class may be classified into four types, i.e., a vertical edge, a horizontal edge, a 45-degree edge, and a 135-degree edge.

Figure 7:
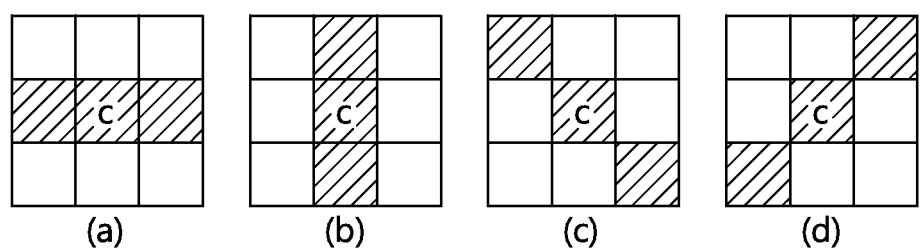
FIG. 7 illustrates four classes of an edge offset.

FIG. 7 illustrates four classes of an edge offset. In the example of FIG. 7, an edge consisting of a current pixel and a neighboring pixel is a horizontal edge in case of (a), a vertical edge in case of (b), a 135-degree edge in case of (c), and a 45-degree edge in case of (d).

An encoder and a decoder may classify a relation between a pixel value of a pixel to which the edge offset will be applied and a pixel value of the neighboring pixel into four categories for each class, and may apply an offset value according to a corresponding category.

Figure 8:
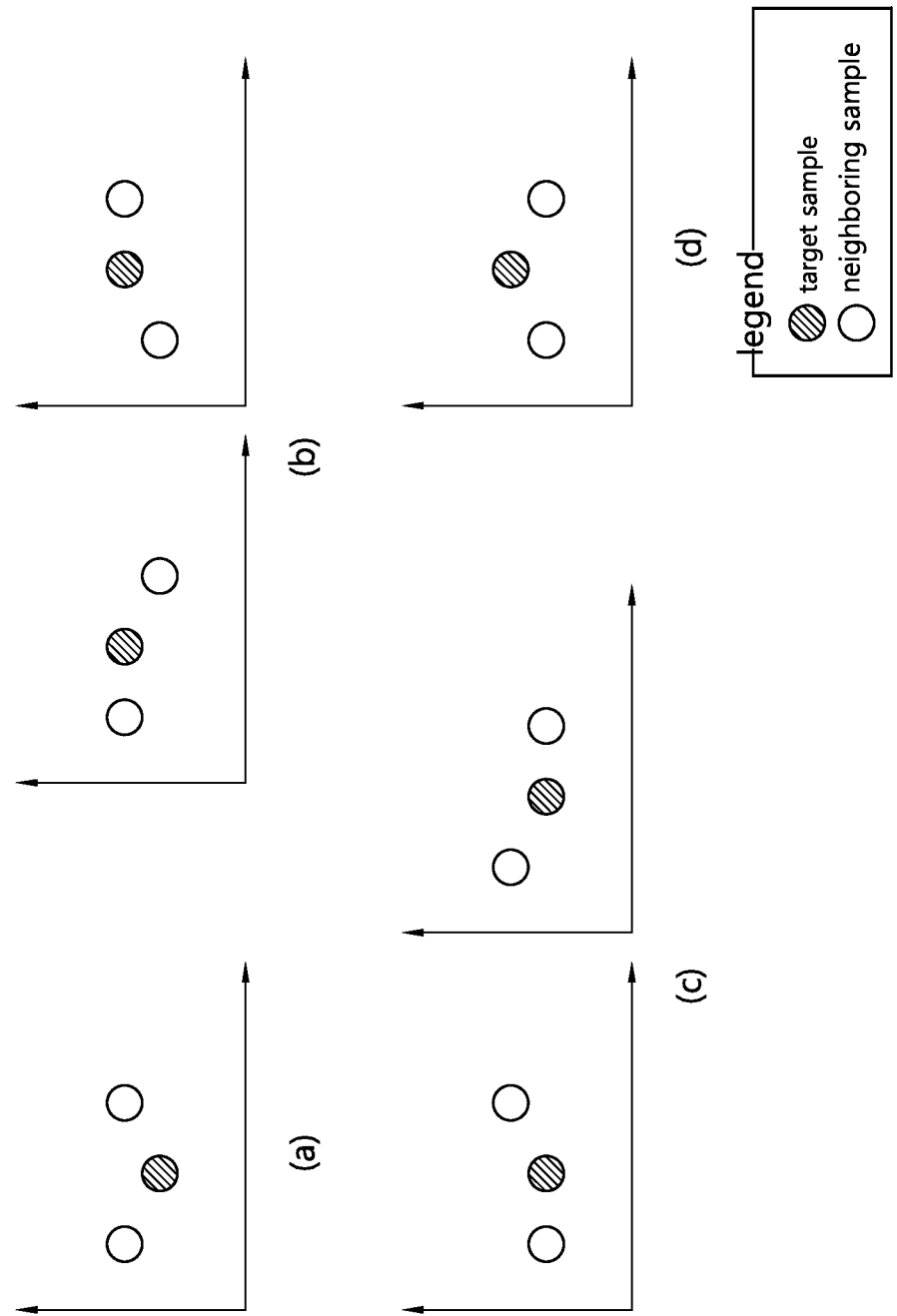
FIG. 8 schematically illustrates a category of an edge offset.

FIG. 8 schematically illustrates a category of an edge offset.

Referring to FIG. 8, the category of the edge offset may be classified into four categories, that is, a case where a pixel value of a target pixel is less than neighboring two pixels as shown in (a), a case where the pixel value of the target pixel is equal to neighboring one pixel and greater than the other pixel as shown in (b), a case where the pixel value of the target pixel is equal to one neighboring pixel and less than the other neighboring pixel as shown in (c), and a case where the pixel value of the target pixel is greater than the neighboring two pixels as shown in (d).

The neighboring two pixels compared to determine the category of the edge offset may be determined according to a class of a block (e.g., a CTU) to which an SAO will be applied. For example, the neighboring two pixels compared to determine the category may be two above and bottom pixels of a target pixel in case of a vertical edge, may be left and right pixels of the target pixel in case of a horizontal edge, may be left-above and right-bottom pixels of the target pixel in case of a 45-degree edge, and may be left-bottom and right-above pixels of the target pixel in case of a 135-degree edge.

When two neighboring pixels of a current pixel are selected according to a class, and a category is determined according to a relation with respect to the selected pixel, then an offset value applied to the edge offset may be derived according to the category of the current pixel.

When the edge offset is applied, the encoder may transmit information instructing to apply the edge offset and offset information based on the category to a decoder. For example, the encoder may transmit information specifying an offset value for each category to the decoder.

When the edge offset is applied, the decoder may apply the offset to the target pixel according to a category to which the target pixel belongs. For example, on the basis of information regarding an offset value received from the encoder, the decoder may derive the offset value to be applied to the current picture according to the category of the current pixel.

The offset value may be transmitted from the encoder to the decoder by being divided into information indicating a magnitude and information indicating a sign.

When an SAO is applied, the encoder may transmit to the decoder an SAO type index to specify which one will be applied between the aforementioned edge offset and the band offset.

Table 12 shows an example of an SAO type index specifying an SAO to be applied.

TABLE 12

| SAO type index | SAO type |
|---|---|
| 0 | not applied |
| 1 | band offset |
| 2 | edge offset |

In the example of using Table 12, the encoder may transmit whether the SAO will be applied, whether the band offset will be applied, and whether the edge offset will be applied, to the decoder through the SAO type index.

The decoder may not apply the SAO when the received SAO type index is 0, may apply the band offset when the received SAO type index is 1, and may apply the edge offset when the received SAO type index is 2.

In the example of Table. 12, whether the band offset will be applied or the edge offset will be applied is indicated by the SAO type index. Therefore, when the band offset is applied, information indicating a start band and information indicating an offset value may be transmitted separately, and when the edge offset is applied, information indicating an edge class and the offset value may be transmitted separately.

Figure 9:
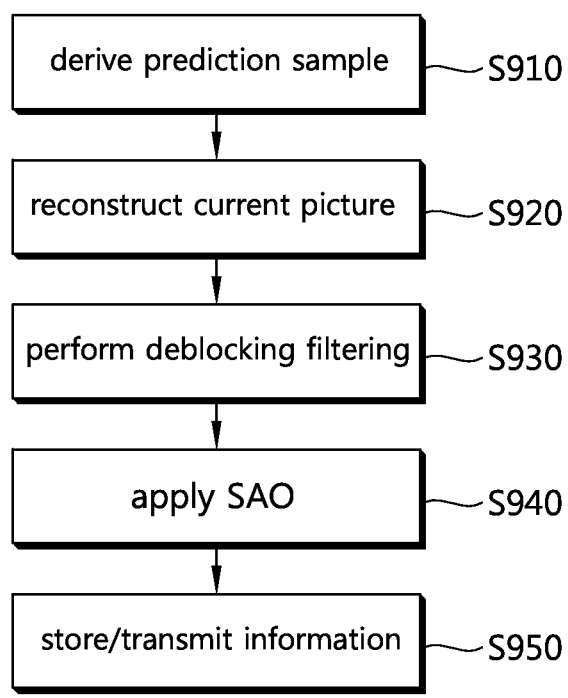
FIG. 9 is a flowchart for schematically illustrating an example for an operation of a video encoder according to the present invention.

FIG. 9 is a flowchart for schematically illustrating an example for an operation of a video encoder according to the present invention.

Referring to FIG. 9, the encoder may derive a prediction sample for a current block (S910). In case of inter prediction, the encoder may derive the prediction sample in unit of a prediction block. In case of intra prediction, the encoder may derive the prediction sample in unit of a transform block. The encoder may derive the prediction sample in unit of the transform block, and thus may derive the prediction sample for the current picture.

When performing the inter prediction, if inter-layer prediction is not performed on the current block, the encoder may derive the prediction sample for the current block by using a spatial neighboring block and temporal neighboring block of the same layer as the current block. When the inter-layer prediction can be performed on the current block, the encoder may derive the prediction sample for the current block by using information of a spatial neighboring block of the same layer as the current block and a corresponding block in a layer different from a layer of the current block.

When the prediction sample for the current block is derived based on the motion vector prediction for the current block (when the MVP mode is applied), if the inter-layer prediction can be performed, the encoder may derive the motion vector for the current block by using any one of a motion vector of spatial neighboring blocks of the same layer as the current block and a motion vector of a corresponding block in a layer different than the current block, and if the inter-layer prediction cannot be performed, the encoder may derive the motion vector for the current block by using any one of the motion vector of the spatial neighboring blocks of the same layer as the current block and a motion vector of a temporal neighboring block of the same layer as the current block.

When the prediction sample for the current block is derived based on the merge mode using the motion information of the neighboring block, if the inter-layer prediction cannot be performed on the current block, the encoder may derive the motion information for the current block by using any one of motion information of spatial neighboring blocks of the same layer as the current block and motion information of a temporal neighboring block of the same layer as the current block, and if the inter-layer prediction can be performed on the current block, the encoder may derive the motion information for the current block by using any one of the motion information of the spatial neighboring blocks of the same layer as the current block and motion information of a corresponding block in a layer different than the current block.

A detailed method of deriving the prediction sample of the current block is the same as described above.

The encoder may reconstruct the current picture (S920). The encoder may reconstruct the current picture by adding the derived prediction sample and a residual.

The encoder may apply deblocking filtering to block edges in the reconstructed picture (S930). The encoder may determine whether to apply the deblocking filtering on the basis of boundary strength for the block edge. Details of the deblocking filtering method are the same as described above.

The encoder may apply an offset to a sample of the reconstructed picture on which a deblocking process is complete (S940). The encoder may apply a band offset or an edge offset to a sample of the current picture. Details of an offset (SAO) applied for each sample are the same as described above.

The encoder may store information regarding a reconstruction of the current picture and information regarding the reconstructed picture, and may transmit related information (S950). As to prediction, the encoder transmits information regarding whether inter-layer prediction is possible to the decoder. In addition, the encoder may transmit information indicating whether to apply a skip mode to the current block, information indicating whether it is inter prediction or intra prediction, information indicating a mode of the inter prediction, information indicating a mode of the intra prediction, residual information, etc., to the decoder. The encoder may also transmit information including a merge index in case of a merge mode, and may transmit information including MVP indication information, MVD information, a reference index, etc., in case of an MVP mode.

Figure 10:
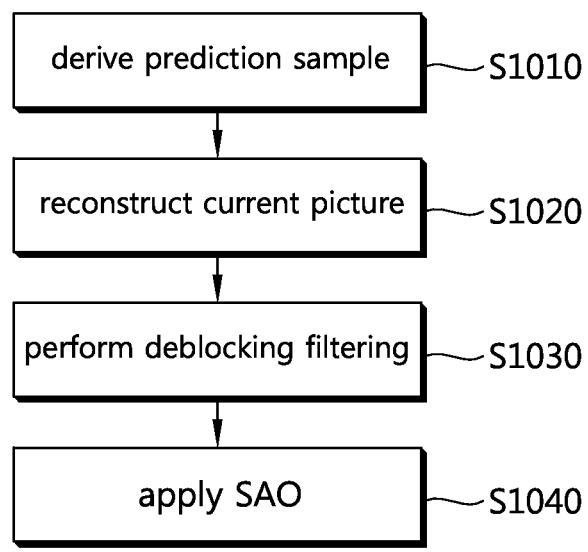
FIG. 10 is a flowchart schematically illustrating an example regarding an operation of a video decoder according to the present invention.

FIG. 10 is a flowchart schematically illustrating an example regarding an operation of a video decoder according to the present invention.

Referring to FIG. 10, the decoder may derive a prediction sample for a current block on the basis of information received from an encoder (S1010).

As to prediction, the decoder may receive information regarding whether inter-layer prediction is possible from the encoder. In addition, the decoder may receive information indicating whether to apply a skip mode to the current block, information indicating whether it is inter prediction or intra prediction, information indicating a mode of the inter prediction, information indicating a mode of the intra prediction, residual information, etc., from the encoder. The decoder may also receive information including a merge index in case of a merge mode, and may receive information including MVP indication information, MVD information, a reference index, etc., in case of an MVP mode.

In case of inter prediction, the decoder may derive the prediction sample in unit of a prediction block. In case of intra prediction, the decoder may derive the prediction sample in unit of a transform block. The decoder may derive the prediction sample in unit of the transform block, and thus may derive the prediction sample for the current picture.

When performing the inter prediction, if inter-layer prediction is not performed on the current block, the decoder may derive the prediction sample for the current block by using a spatial neighboring block and temporal neighboring block of the same layer as the current block. When the inter-layer prediction can be performed on the current block, the decoder may derive the prediction sample for the current block by using information of a spatial neighboring block of the same layer as the current block and a corresponding block in a layer different from a layer of the current block.

When the prediction sample for the current block is derived based on the motion vector prediction for the current block (when the MVP mode is applied), if the inter-layer prediction can be performed, the decoder may derive the motion vector for the current block by using any one of a motion vector of spatial neighboring blocks of the same layer as the current block and a motion vector of a corresponding block in a layer different than the current block, and if the inter-layer prediction cannot be performed, the decoder may derive the motion vector for the current block by using any one of the motion vector of the spatial neighboring blocks of the same layer as the current block and a motion vector of a temporal neighboring block of the same layer as the current block.

When the prediction sample for the current block is derived based on the merge mode using the motion information of the neighboring block, if the inter-layer prediction cannot be performed on the current block, the decoder may derive the motion information for the current block by using any one of motion information of spatial neighboring blocks of the same layer as the current block and motion information of a temporal neighboring block of the same layer as the current block, and if the inter-layer prediction can be performed on the current block, the decoder may derive the motion information for the current block by using any one of the motion information of the spatial neighboring blocks of the same layer as the current block and motion information of a corresponding block in a layer different than the current block.

A detailed method of deriving the prediction sample of the current block is the same as described above.

The decoder may reconstruct the current picture (S1020). The decoder may reconstruct the current picture by adding the derived prediction sample and a residual.

The decoder may apply deblocking filtering to block edges in the reconstructed picture (S1030). The decoder may determine whether to apply the deblocking filtering on the basis of boundary strength for the block edge. A detailed deblocking filtering method is the same as described above.

The decoder may apply an offset to a sample of the reconstructed picture on which a deblocking process is complete (S1040). The decoder may apply a band offset or an edge offset to a sample of the current picture. Details of an offset (SAO) applied for each sample are the same as described above.

Although a base layer and a spatial base layer are used without distinction and an enhancement layer and an spatial enhancement layer are used without distinction in the description of the present specification, this is for convenience of explanation. Therefore, embodiments of the present invention are not limited to the base layer and the spatial enhancement layer. The spatial base layer is used as an example for a case where a resolution is applied as scalability of the base layer, and the spatial enhancement layer is used as an example of a case where the resolution is applied as scalability for the enhancement layer. It should be noted that embodiments of the present invention are also equally applicable to various scalabilities (time, bit rate, frame rate, etc.) as described above.

In addition, it should be noted that a neighboring block of a current block is used in the present specification to specify motion information of the neighboring block together with a spatial location of the neighboring block. More specifically, validity and redundancy for the neighboring block of the current block may imply validity of motion information of the neighboring block and whether it overlaps with motion information of another neighboring block.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, since the aforementioned embodiments can include various aspects of examples, a combination of respective embodiments should also be understood as one embodiment of the present invention. Therefore, all replacements, modifications and changes should fall within the spirit and scope of the claims of the present invention.

What is claimed is:

1. A video decoding method in a multi-layer structure supporting scalability performed by a decoding apparatus, comprising:
    receiving inter-layer prediction enabled information for a current picture;
    when the inter-layer prediction enabled information specifies that an inter-layer prediction is enabled for the current picture, constructing a merge candidate list including an inter-layer candidate for a current block in a current layer;
    deriving motion vector for the current block based on the merge candidate list;
    deriving a prediction sample for the current block based on the motion vector for the current block;
    reconstructing a current picture by adding the prediction sample and a residual sample;
    applying a deblocking filter to a block edge in the reconstructed current picture; and
    after the applying of the deblocking filter is complete, applying a band offset or an edge offset to a sample of the reconstructed current picture,
    wherein when the inter-layer prediction enabled information specifies that the inter-layer prediction is enabled for the current picture, the inter-layer candidate is present, instead of a temporal candidate derived from a temporal neighboring block in the current layer, in the merge candidate list,
    wherein the inter-layer candidate is derived from a corresponding block in a reference layer which is different from the current layer,
    wherein the merge candidate list includes spatial candidates derived from spatial neighboring blocks in the current layer,
    wherein the inter-layer candidate is positioned after the spatial candidates in the merge candidate list, and
    wherein a position of the inter-layer candidate in the merge candidate list is same as a position of the temporal candidate in the merge candidate list for a case of the inter layer prediction is not enabled for the current picture based on the inter-layer prediction enabled information.

2. The video decoding method of claim 1, wherein a prediction mode of the current block is a merge mode, and a motion vector of a candidate in the merge candidate list is used as the motion vector for the current block,
    wherein the motion vector for the current block is derived by using any one of the motion vectors of the spatial neighboring blocks in the current layer and a motion vector of the corresponding block in the reference layer when the inter-lave prediction enabled information specifies that the inter-layer prediction is enabled for the current picture.

3. The video decoding method of claim 1, wherein the corresponding block in the reference layer has the same picture order count (POC) as the current picture.

4. The video decoding method of claim 1, wherein when the inter-layer prediction enabled information specifies that the inter-la prediction is enabled for the current picture, the motion vector for the current block is selected from available motion vectors of the left block, the left-bottom block, the left-above block, the above block, and the right-above block of the current block and the corresponding block in the reference layer, and
    wherein the selected motion vector is used as the motion vector for the current block.

5. A video encoding method in a multi-layer structure supporting scalability performed by an encoding apparatus, comprising:
    determining whether an inter-layer prediction is enabled for a current picture;
    when it is determined that the inter-layer prediction is enabled for the current picture, constructing a merge candidate list including an inter-layer candidate for a current block in a current layer;
    deriving motion vector for the current block based on the merge candidate list;
    deriving a prediction sample for the current block based on the motion vector for the current block;
    generating a residual which is a difference between the prediction sample and an original signal; and
    transmitting information regarding the residual and information for deriving the prediction sample,
    wherein inter-layer prediction enabled information is transmitted, and the inter-layer prediction enabled information indicates whether inter-layer prediction is enabled for the current picture,
    wherein when it is determined that the layer prediction is enabled for the current picture, the inter-layer candidate is present, instead of a temporal candidate derived from a temporal neighboring block in the current layer, in the merge candidate list, wherein the inter-layer candidate is derived from a corresponding block in a reference layer which is different from the current layer, wherein the merge candidate list includes spatial candidates derived from the spatial neighboring blocks in the current layer, and wherein the inter-layer candidate is positioned after the spatial candidates in the merge candidate list, and wherein a position of the inter-layer candidate in the merge candidate list is same as a position of the temporal candidate in the merge candidate list for a case of the inter layer prediction is not enabled for the current picture.

6. The video encoding method of claim 5, wherein a prediction mode of the current block is a merge mode, and a motion vector of a candidate in the merge candidate list is used as the motion vector for the current block, wherein the motion vector for the current block is derived by using any one of the motion vectors of the spatial neighboring blocks in the current layer and a motion vector of the corresponding block in the reference layer when it is determined that the inter-layer prediction is enabled for the current picture.

7. The video encoding method of claim 5, wherein the corresponding block in the reference layer has the same picture order count (POC) as the current picture.

8. The video encoding method of claim 5, wherein when it i-determined that the inter-layer prediction is enabled for the current picture, the motion vector for the current block is selected from available motion vectors of the left block, the left-bottom block, the left-above block, the above block, and the right-above block of the current block and the corresponding block in the reference layer, and wherein the selected motion vector is used as the motion vector for the current block.

9. The video decoding method of claim 1, wherein when the inter-layer candidate is present in the merge candidate list, the temporal candidate derived from the temporal neighboring block in the current layer is not present in the merge candidate list.

10. The video encoding method of claim 5, wherein when the inter-layer candidate is present in the merge candidate list, the temporal candidate derived from the temporal neighboring block in the current layer is not present in the merge candidate list.

11. A non-transitory computer readable storage medium storing information on instructions, when executed, causing a video decoding apparatus to perform operations comprising:

determining whether an inter-layer prediction is enabled for a current picture based on inter-layer prediction enabled information for the current picture;

when the inter-layer prediction is enabled for the current picture, constructing a merge candidate list including an inter-layer candidate for a current block in a current layer;

deriving motion vector for the current block based on the merge candidate list;

deriving a prediction sample for the current block based on the motion vector for the current block;

reconstructing a current picture by adding the prediction sample and a residual sample;

applying a deblocking filter to a block edge in the reconstructed current picture; and after the applying of the deblocking filter is complete, applying a band offset or an edge offset to a sample of the reconstructed current picture, wherein when the inter-layer prediction is enabled for the current picture, the inter-layer candidate is present, instead of a temporal candidate derived from a temporal neighboring block in the current layer, in the merge candidate list, wherein the inter-layer candidate is derived from a corresponding block in a reference layer which is different from the current layer, wherein the merge candidate list includes spatial candidates derived from spatial neighboring blocks in the current layer, wherein the inter-layer candidate is positioned after the spatial candidates in the merge candidate list, and wherein a position of the inter-layer candidate in the merge candidate list is same as a position of the temporal candidate in the merge candidate list for a case of the inter layer prediction is not enabled for the current picture based on the inter-layer prediction enabled information.

* * * * *